(12) United States Patent
Anderson

(10) Patent No.: US 7,835,350 B2
(45) Date of Patent: *Nov. 16, 2010

(54) PRIORITIZING DATA TRANSMISSIONS USING THE NUMBER OF ASSOCIATED ORIGIN ADDRESSES

(76) Inventor: Keith R. Anderson, 560 N. 75 West, Springville, UT (US) 84663

( * ) Notice: Subject to any disclaimer, the term of this patent is extended or adjusted under 35 U.S.C. 154(b) by 1051 days.

This patent is subject to a terminal disclaimer.

(21) Appl. No.: 11/180,764

(22) Filed: Jul. 13, 2005

(65) Prior Publication Data

US 2005/0249116 A1   Nov. 10, 2005

Related U.S. Application Data

(63) Continuation of application No. 09/753,743, filed on Dec. 27, 2000, now Pat. No. 6,931,003, which is a continuation-in-part of application No. 09/500,721, filed on Feb. 9, 2000, now abandoned.

(51) Int. Cl.
   *H04L 12/56* (2006.01)
(52) U.S. Cl. ..................................... 370/389
(58) Field of Classification Search ............... None
   See application file for complete search history.

(56) References Cited

U.S. PATENT DOCUMENTS

| | | | |
|---|---|---|---|
| 3,860,748 A | 1/1975 | Everhart et al. | |
| 3,987,240 A | 10/1976 | Schultz | |
| 4,766,536 A * | 8/1988 | Wilson et al. | 710/121 |
| 4,897,841 A | 1/1990 | Gang, Jr. | |
| 4,947,389 A | 8/1990 | Eng et al. | |
| 5,033,112 A | 7/1991 | Bowling et al. | |
| 5,148,144 A | 9/1992 | Sutterlin et al. | |
| 5,202,780 A | 4/1993 | Fussanger | |
| 5,218,676 A * | 6/1993 | Ben-Ayed et al. | 709/240 |
| 5,450,399 A * | 9/1995 | Sugita | 370/392 |
| 5,477,091 A | 12/1995 | Fiorina et al. | |
| 5,530,860 A * | 6/1996 | Matsuura | 718/105 |
| 5,572,517 A | 11/1996 | Safadi | |

(Continued)

OTHER PUBLICATIONS

Carl-Mitchell et al., "Using ARP to Implement Transparent Subnet Gateways," Texas Internet Consulting, Oct. 1987, (8 pages).

(Continued)

*Primary Examiner*—Ayaz R Sheikh
*Assistant Examiner*—Timothy J Weidner

(57) ABSTRACT

An apparatus, data structures, and method are provided for prioritizing data transmissions within a network. As applied to a switching station in a network, the method prioritizes transmissions from the network to determine which packets should be transmitted from the switching station first when multiple packets are routed to the same outgoing port of the switching station. A packet prioritization station is provided, preferably as an add-on to the switching station. The packet prioritization station has a cache in which the destination address of each incoming packet is associated with every origin from which it has received a transmission within a certain time period. The packet prioritization station operates to give priority to transmissions to those destinations that have a higher number of associated origins. Thus, packets that are probably en route to time-critical users or groups of users will be sent before those that are less time-sensitive.

26 Claims, 13 Drawing Sheets

U.S. PATENT DOCUMENTS

| | | |
|---|---|---|
| 5,600,644 A | 2/1997 | Chang et al. |
| 5,654,985 A * | 8/1997 | Crayford et al. ............ 375/211 |
| 5,699,276 A | 12/1997 | Roos |
| 5,701,120 A | 12/1997 | Perelman et al. |
| 5,815,662 A * | 9/1998 | Ong ............................ 725/92 |
| 5,847,751 A | 12/1998 | Safadi |
| 5,867,484 A | 2/1999 | Shaunfield |
| 5,892,912 A | 4/1999 | Suzuki et al. |
| 5,896,385 A | 4/1999 | Achilleoudis |
| 5,920,802 A | 7/1999 | Bellows et al. |
| 5,926,101 A | 7/1999 | Dasgupta |
| 5,937,428 A * | 8/1999 | Jantz .......................... 711/114 |
| 5,960,411 A | 9/1999 | Hartman et al. |
| 5,963,566 A | 10/1999 | Rajsuman et al. |
| 5,978,373 A | 11/1999 | Hoff et al. |
| 5,982,767 A | 11/1999 | McIntosh |
| 5,982,854 A | 11/1999 | Ehreth |
| 5,994,998 A | 11/1999 | Fisher et al. |
| 6,003,079 A * | 12/1999 | Friedrich et al. ............ 709/224 |
| 6,009,097 A | 12/1999 | Han |
| 6,016,307 A | 1/2000 | Kaplan et al. |
| 6,023,467 A | 2/2000 | Abdelhamid et al. |
| 6,023,734 A | 2/2000 | Ratcliff et al. |
| 6,058,367 A | 5/2000 | Sutcliffe et al. |
| 6,079,020 A | 6/2000 | Liu |
| 6,085,249 A | 7/2000 | Wang et al. |
| 6,104,711 A | 8/2000 | Voit |
| 6,104,727 A | 8/2000 | Moura et al. |
| 6,112,251 A | 8/2000 | Rijhsinghani |
| 6,122,740 A | 9/2000 | Andersen |
| 6,130,879 A | 10/2000 | Liu |
| 6,140,911 A | 10/2000 | Fisher et al. |
| 6,144,668 A | 11/2000 | Bass et al. |
| 6,151,629 A | 11/2000 | Trewitt |
| 6,169,741 B1 | 1/2001 | LeMaire et al. |
| 6,175,569 B1 | 1/2001 | Ellington, Jr. et al. |
| 6,236,654 B1 * | 5/2001 | Egbert ........................ 370/392 |
| 6,263,368 B1 * | 7/2001 | Martin ........................ 709/224 |
| 6,421,675 B1 * | 7/2002 | Ryan et al. .................. 707/100 |
| 6,542,964 B1 * | 4/2003 | Scharber ..................... 711/122 |
| 6,580,715 B1 * | 6/2003 | Bare ........................... 370/396 |
| 6,633,567 B1 * | 10/2003 | Brown ..................... 370/395.3 |
| 6,917,614 B1 * | 7/2005 | Laubach et al. ............. 370/392 |
| 7,000,026 B2 * | 2/2006 | Beshai et al. ............... 709/238 |
| 7,016,365 B1 * | 3/2006 | Grow et al. ................. 370/413 |
| 7,257,118 B2 * | 8/2007 | Chase et al. ................ 370/392 |

OTHER PUBLICATIONS

J. Postel, "Multi-LAN Address Resolution," ISI, Oct. 1984, (15 pages).

\* cited by examiner

PRIORITIZING DATA TRANSMISSIONS USING THE NUMBER OF ASSOCIATED ORIGIN ADDRESSES

CONTINUATION DATA

This application is a continuation of U.S. application Ser. No. 09/753,743 "Packet Prioritization Protocol for a Large-Scale, High Speed Computer Network" filed on Dec. 27, 2000, now U.S. Pat No. 6,931,003 whose inventor is Keith R. Anderson, which is a continuation-in-part of U.S. application Ser. No. 09/500,721 titled "Large-Scale, High Speed Computer network and Method of Implementation and Operation" and filed on Feb. 9, 2000, now abandoned whose inventors are Keith R. Anderson, Larry G. Erdmann, Jock Andrews, Richard H. Christensen, Marcio Pugina, Jason S. Veech, Kevin J. Peppin, and Craig A. Miller.

BACKGROUND OF THE INVENTION

1. The Field of the Invention

The present invention relates to computer communications networks. More specifically, the present invention relates to methods of prioritizing data transmissions.

2. The Relevant Technology

Computer technology is breaking barriers to inter-personal communications at an amazing rate. Already, it is possible to communicate almost instantaneously with anyone in the world that has a computer and a telephone line. Computer networks, such as the Internet, link individuals and various types of organizations in world-wide digital communication The Internet has almost unlimited promise for communications advances, but is limited by an overburdened and somewhat unsuited transmission medium.

In addition to the Internet, businesses, educational institutions, government agencies, and other similarly related entities also communicate over much smaller-scale networks, such as local area networks (LANs) and wide area networks (WANs). These small-scale networks, particularly LANS, operate at much higher speeds than the Internet, but are expensive to operate at large scales. Thus, a large gap exists, between the scope of coverage and speed of operation of the global, but relatively slow, Internet and the faster but more limited LANs and WANs. It would be advantageous to close this gap with larger-scale networks that operate at speeds close to that of LANS.

Several barriers exist to filling the gap between current limited coverage networks and the Internet. One such barrier is the "last mile" dilemma. That is, the Internet runs at very high speeds over its backbone, but slows down considerably over its localized connections. Generally, the Internet relies upon standard telecommunications industry lines and switching equipment for this last mile. This infrastructure is designed for telephone communications, and is not well adapted to the packetized communications of digital networks. A dilemma lies, however, in replacing, the telephone infrastructure with transmission mediums more suited to digital communications. It is currently considered prohibitively expensive to connect high speed communications lines down to the individual users of the Internet.

This fact, together with the general congestion of the Internet in general leads to a substantial slow down of Internet communications. It also limits the deployment of intermediate types of networks. A further barrier to the implementation of networks of varying scopes and to the new introduction of new paradigms for network communication comes in the form of financing. Such developments using current technology would be prohibitively expensive. Who is going to pay for this infrastructure?

Accordingly, a need exists for an intermediate sized network to close the gap between the world-wide Internet and current relatively small scale networks. Preferably, such an intermediate sized network operates at speeds similar to those of LANS, coverage both in geographical area and diversify of user type. Additionally any solution to this problem should also address financing of installation and should overcome the last mile dilemma. New technologies for achieving such a new paradigm in computer networking are similarly needed.

In addition to the lack of larger scale, high-speed networking, prior art networks of every size have additional problems. Many of these problems result from the way in which switching is carried out by known networks. Switches are simply junctions for multiple communication lines. A "data transmission" is simply an analog or digital signal sent from an origin to a destination. Bundled data transmissions, or "packets," arrive at an incoming port of the switch, and are routed to the proper outgoing port to reach their destination. (Although each port is capable of two-way communication, the port through which a packet arrives is designated as the incoming port, while that port through which it will exit is the outgoing port.) A data transmission from one computer to another may pass through several switches, depending on the size of the network involved. Full-duplex, switched networks are generally far faster than their half-duplex, unswitched counterparts.

However, a special problem arises when multiple packets simultaneously arrive at a switch through different incoming ports, and all of the packets must go through the same outgoing port. Since a line is only capable of conveying a single packet at a time, one packet will be sent while the rest wait. Current networking systems possess significant drawbacks in that they entirely fail to prioritize, or prioritize improperly, the order in which the packets are transmitted.

This has many undesirable effects. Since the switches are typically utilized in a branching network, many more switches may be downstream from the outgoing port. The switch itself is unaware of what type of destination any packet is sent to. The destination may be a server hosting many users simultaneously, or it may be a single home user.

As a result, people waiting for critical communications are forced to wait for other, less important traffic. For example, a company may have a large number of employees receiving e-mail through a server on the network. The e-mails may contain important instructions, information, questions, etc. that should not be delayed. However, if the e-mail is routed through the same switch as a large file download requested by a computer near the mail server, i.e., at the same outgoing port, the e-mail traffic may be slowed down by waiting for the file download. This occurs even though delays are inconsequential for the download, which will require several minutes in any case. Similarly, a number of computer users performing research over the Internet, using a variety of different sites, may be slowed down by a single user transmitting real time game data to another user.

No previously known system provides a sufficient solution to this problem. Simply sending packets through the port in sequential, cyclical form, or "round robin" form, provides equal time to each communication through the switch, and causes the problems described above. Giving priority to the heaviest user, i.e., the destination that has received the most packets, is inadequate because the volume of data is not proportional to its importance.

Thus, a there is a need, unfulfilled by the prior art, for a new method for prioritizing transmission of packets from a switching station. The method should preferably prioritize transmission according to the destination that is receiving the most important, i.e. time critical, information, while avoiding entirely blocking other destinations for lengthy periods of time. In addition, hardware and suitable data structures are needed for carrying out the method described above.

Another problem with known networks is broadcasting. Broadcasting occurs when a packet is sent to an unresolved destination. Communications over the Internet often take place on the third, or network layer of the ISO/OSI model, which is the Internetwork, or IP layer, of the TCP model. Transmissions may be addressed to a certain IP address, but the IP address is a property of the network, and may not be the same for a given device every time. Internet service providers (ISP's), for example, will often assign a temporary IP address to each individual dialed up computer.

In order to successfully route a packet to the proper device, a switch must have access to the hardware, or MAC address of the device, which is unique to each individual network interface card (NIC) that connects a computer to the network. The MAC address corresponds with the second layer of the ISO/OSI and TCP models. A computer sending a transmission may not always have access to the receiver's hardware address.

Thus, the sending computer sends an address resolution protocol (ARP) broadcast, or packet without a specific MAC address destination, which will then be propagated to multiple computers. The ARP broadcast contains a designated IP address for the destination computer, and acts as a request for a requested MAC address of the computer that has that IP address. The computer that has the IP address responds by sending a packet back to the origin of the broadcast, with its MAC address included in the packet. The computers can then communicate directly over the network without broadcasting to other users.

The problem with ARP broadcasting is that it creates a great deal of unnecessary traffic on a system. The ARP broadcast itself typically does not contain a great deal of data, but it must be transmitted to many computers, thereby occupying a great deal of bandwidth. Even if a receiving computer's MAC address is resolved by one transmitting computer on the network, another transmitting computer may transmit data to the computer, thus requiring another ARP broadcast. In a network or branch with a large number of users, a great deal of the network's bandwidth may be occupied by ARP broadcasting.

Consequently, it would be an advancement in the art to provide a method and apparatus capable of reducing ARP broadcasting. The method and apparatus should enable transmitting computers to obtain the MAC addresses of computers to which they will send data, without propagating every ARP broadcast to every computer. Furthermore, the method and apparatus should preferably reduce ARP broadcasting without the need to replace a great deal of the currently-existing network infrastructure. The method and apparatus should be inexpensive, low-maintenance, and fast. Finally, the method should be fully compliant with existing protocols for network data transmission, so as to be transparent to computers and end users on the network.

BRIEF SUMMARY OF THE INVENTION

In order to overcome many or all of the above-discussed problems, the present invention comprises methods, apparatus, and systems for implementing Large-scale high speed computer network. The network may connect an entire neighborhood or city in networked communications, and accordingly, will be referred to herein as a Neighborhood Area Network (NAN). The NAN of the present invention is a network conducted on a unique scale with a unique clientele and is implemented in a manner that transcends traditional network boundaries and protocols. The NAN is not equivalent to a wide area network WAN, in part because it is essentially routerless. That is, while a plurality of NAN, may be interconnected through the use of routers, each individual NAN is preferably constructed without the use of internal routers. The NAN is unique from local area networks (LANs) as well. One reason is that, due to its many novel features, it can be of a size and scope previously unobtainable by conventional LANs.

The NAN is further unique because it is intended to cover and serve a selected geographical area and to blanket that geographical area, rather than functioning to serve a specific government, business, educational, or similarly related entity. Accordingly, the subscribers and users of the NAN may be substantially non-related in any traditional business manner. Furthermore, funding for the NAN, rather than being provided by a business-type entity or subsidized by a governmental organization, may be funded at least in part by an independent third party, such as a utility company and may be funded in total or in part by subscribers.

The NAN is also comparatively inexpensive to install, making the placement of a NAN in every neighborhood a real possibility. The NAN of the present invention is capable of eliminating the message traffic burden from the Internet, thereby speeding up the Internet, as it is adapted to be operated completely independent of the currently highly burdened telecommunications infrastructure (although Internet service may be provided over the NAN).

In one embodiment, the NAN is comprised of an optic fiber ring serving as the outer backbone of the NAN. The ring is preferably populated with one or more fiber boxes, each containing circuitry including switches, repeaters, gateways, etc. The fiber boxes in one embodiment connect the backbone to a central office or headquarters data center in which a server is preferably located. One or more gateways are preferably provided within the backbone for access by Internet Service Providers (ISPs). An inner backbone comprised of scalable 10 to 100 megabit coaxial cable preferably branches from the fiber backbone.

The coaxial cable preferably originates at the fiber boxes and branches through the selected geographical region (discussed herein as a neighborhood, but of course, any geographical scale could be served), connected by repeaters and nodes to individual communicating stations. The inner backbone is preferably partitioned for efficient routing of traffic.

The nodes in one embodiment comprise hubs. The repeaters may be placed three hundred feet apart along the coaxial cable, with hubs placed within thirty feet of every house, business, or other type of communicating station on the NAN. The hubs preferably connect to the local houses or other buildings with ten-base-T twisted pair copper wiring employing the Category 5 (Cat5) standard. The hubs in one embodiment are powered by one or more of the communicating stations that they service. Accordingly, each station connected to a hub may share the powering of the hub and may share the powering of other switching equipment of the NAN as well.

In one embodiment NAN software operates on the server, the fiber boxes, the repeaters, and the hubs. Client software preferably operates a computers located at each communicating station. Additional functional software or logic may also execute on communicating stations or computers of subscribing service providers. For example, software may communicate with an electric power meter for transmitting information regarding power consumption from a communicating station (the power customer) through the network to third party service provider, in this case, a utility power company.

In one embodiment, at least a portion of the backbone is installed over the right-of-way owned by or franchised to a public utility such as gas, electric, or power company. This negates any need for a separate utility administering the NAN to acquire a new easement or franchise from the landowners or the government entity of the geographic region. The NAN may be financed and/or installed through the cooperation of the utility service provider company. This arrangement allows the public utility service provider that would otherwise be unable to enter the digital communication market to participate. It is also advantageous in that a NAN developer or administration entity would otherwise likely be unable to afford to finance and install the NAN due to the cost and risk of funding and lack of sufficient rights-of-way.

In certain embodiments of an apparatus and method in accordance with the present invention, an independent entity may create a city-wide network or NAN. The network includes, in one embodiment, a fiber optic ring within the city to serve as a local backbone.

The fiber optic ring may be fully redundant. That is, it preferably completes a loop such that any break in the loop will not shut the whole system down. The fiber can be laid inexpensively as distances are not great and thus, less expensive local short-distance-types of fiber cable can be used. A low cost fiber can be used, such as feeder fiber which is less costly, and which requires less labor to install.

The fiber backbone is preferably populated by fiber boxes having switches therein. Coaxial cable from switches to bridges and repeaters to hubs. The hubs may connect to client stations using twisted-pair, copper cabling. A central server may be used and may be located within a headquarters data center. A headquarters data center may be employed as a gateway for Internet service providers. In addition, the Internet service providers may enter the system through other gateways including one or more switches.

The fiber backbone may be laid using the franchise agreement granted to the power company within a city or region. Thus, as the entire network is laid independently, the ISP service is provided independent of the telecommunications line over the entire route. Additionally, all ISPs are available on the net allowing equal access without choking traffic.

The infrastructure is preferably upgradable from 10 megabit to gigabit technology over the same lines, such that the lines need not be relaid in order to upgrade. Services that can be provided include surveillance, on-line books, two-way multi camera, schools, etc. Additionally, IPBX, telephone, television, CATV, and video on demand can be provided over the NAN. Video can be provided allowing independent selection, broadcast, start time and may be buffered to the user in real time.

The NAN also preferably incorporates one or more multi-port switches which are configured to truncate broadcast data. The multi-port switch is preferably an indoor switch but is contained in an aluminum pedestal of dimensions approximately 3 by 2 by 2 feet and is environmentally controlled The repeaters in preferred embodiments convert the data from the switches to be transmitted over coaxial cable and are preferably semi-intelligent. In one embodiment, the repeaters are housed out of doors within a protective pedestal. The pedestal may be located on the ground or hung from power lines.

The bridges are, in preferred embodiments, high speed with a look-up binary tree and are preferably contained in the protective pedestals. The bridges also filter out broadcast traffic. The hubs route traffic to subscribing communicating stations and convert from coaxial to twisted pair cable. The hubs are connected with a T-connector and powered by the cooperative power coupler of the present invention.

The P-coupler preferably includes a series of transformers, one at each communicating station. The communicating station connect with Cat5 wiring to the hub through a home connection box. The home connection box preferably provides convenient connections for power to the hub and for transmit and receive lines. The lines at the home connection box are wired alphabetically. The home connection box connects preferably connects with Ethernet cabling to a network card located within a computer at the client station.

A modular power connector is preferably located at the home connection box. The wiring from the communicating station to the hub operates, in one embodiment, at ten megabytes per second. Three pairs of lines are preferably used, a transmit twisted pair, a receive twisted pair, and an A/C twisted pair running from the transformer to power the hub.

The NAN of the present invention is a high speed routerless network which differs from traditional large scale networks in that traffic is routed locally and that it has the speed of a small local area network but with many more stations connected thereto. The large amount of communicating stations is facilitated by the many novel aspects of the invention.

The NAN can be described as a baseband network rather than a broadband network because it addresses communicating stations directly and linearly rather than through broadcasting of data. The NAN of the present invention defines what cannot be routed rather than defining the types of packets that can be routed. The NAN also preferably uses converse/inverse filtering. Because the communications traffic is direct-routed, neighbor to neighbor communication is very high speed and occupies only a small part of the NAN. It also reduces the burden on the Internet.

Moreover, a packet prioritization method with an apparatus suitable for its implementation is included to improve prioritization of packets leaving a switching station. (A switching station refers to any device that performs switching between a plurality of ports, regardless of whether the device is designated as a hub, bridge, switch, repeater etc.) The switching station may have a number of ports, each of which has a buffer to temporarily store incoming packets. The switching station may also have a processor and program memory containing instructions for the processor. A cache may also be provided for additional data storage, with a multiplexer to enable the cache to simultaneously receive signals from multiple sources. The processor, buffers, and multiplexer may all be linked by a bus.

Similarly, a packet prioritization station is provided, either as an integral part of the switching station, or as an addition, such as an auxiliary expansion card or board (AEC). If embodied as an AEC, the packet prioritization station may have a bus linked to the bus of the switching station by an interrupt controller that triggers the packet prioritization station when the proper conditions are met in the switching station. The switching-station, in its independent form, has a processor and a program memory, both of which may take multiple forms. The processor carries out instructions provided by the program memory in order to carry out the functions of the packet prioritization station.

A cache in the packet prioritization station contains a database binding each MAC layer address (or destination) to other MAC layer addresses (or origins) that have sent packets to that MAC layer address. These destinations and origins are obtained by copying them from a sampling of all packets passing through the switching station. The origins are maintained in the database for a certain period of time. The processor, program memory, and cache of the packet prioritization station are all linked by the bus.

When a new packet is received through an incoming port of the switching station, it is stored in the buffer for the incoming port. Meanwhile, the switching station matches it up with one or more ports, through which it will be transmitted to reach its destination. When packets in multiple buffers are not routed to a single outgoing port, the packets in the buffers are simply sent to their respective outgoing ports in cyclical, or "round robin" fashion. However, when more than one packet is routed to an outgoing port, the packet prioritization station must determine which packet get priority.

It has been discovered that those packets being sent to destinations for which many origins are cached typically are of a higher relative importance, because they represent multiple users or time-intensive network use. The packet prioritization station proceeds through packets routed to a single port in round robin format, until it encounters the first packet with a destination having more than a threshold number of origins bound to it. That packet is immediately sent. When no packet routed to the outgoing port has a destination that has recently received packets from the threshold number of origins, packets are sent in round robin fashion, i.e., by sending packets from alternating incoming ports. The process continues until traffic to that outgoing port subsides.

Consequently, destinations receiving data from many sources will receive priority. More time-critical communications are transferred first, because smaller files, such as e-mail, are typically those for which rapid response is especially important. Large information transfers, such as file downloads, normally are not as critical, and can therefore be delayed until after more important information has been routed. Similarly, files from multiple origins are often sent to multiple recipients. Thus, the packet prioritization station handles the needs of the majority of users as rapidly as possible.

Furthermore, a traffic reduction method and apparatus may also be implemented according to the present invention. An ARP caching station may be provided to work in concert with the switching station. The ARP caching station may be used with or without the packet prioritization station, and the packet prioritization station may similarly function independent of the ARP caching station.

The ARP caching station may also be integral with the switching station, and may share its components for operation. Alternatively, the ARP caching station may be an AEC with independent componentry, in communication with the switching station. Thus, the ARP caching station may have its own processor, program memory, and cache, linked by a bus. As with the packet prioritization station, the bus of the ARP caching station may be linked to the bus of the switching station by an interrupt controller. Thus, operation of the ARP caching station may also be triggered by the switching station.

The ARP caching station may have its own database containing associated IP addresses and MAC addresses. These may be obtained by storing the addresses from any packet, such as an ARP broadcast response, that contains both an IP address and a MAC address denoting the same destination.

When an ARP broadcast is received by the switching station, the ARP caching station may be activated to look for the designated IP address in the cache, and return the associated, requested MAC address if it is available. If the requested MAC address is not found in the cache, the ARP caching station may store the designated IP address in the cache for future reference, or may simply store nothing until another packet with an IP address and a matching MAC address is received. In any case, the ARP broadcast is then propagated by the switching station so that a response can be sent by the destination (the computer having the designated IP address).

If the requested MAC address is available, the ARP caching station creates a packet in the proper form for an ARP broadcast response containing the requested MAC address, and sends it to the originator of the ARP broadcast. The ARP broadcast need not be propagated by the switching station. Thus, if the requested MAC address is in the cache, considerable bandwidth is saved by avoiding transmission of the broadcast through all ports on the switch (except the incoming port of the ARP broadcast). The originator of the broadcast also receives a quicker response and can begin transmitting information to the destination with little delay.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Incorporation by Reference

U.S. application Ser. No. 09/753,743 "Packet Prioritization Protocol for a Large-Scale, High Speed Computer Network" filed on Dec. 27, 2000, whose inventor is Keith R. Anderson is hereby incorporated by reference in its entirety as though fully and completely set forth herein.

U.S. application Ser. No. 09/500,721 titled "Large-Scale, High Speed Computer network and Method of Implementation and Operation" and filed on Feb. 9, 2000, whose inventors are Keith R. Anderson, Larry G. Erdmann, Jock Andrews, Richard H. Christensen, Marcio Pugina, Jason S. Veech, Kevin J. Peppin, and Craig A. Miller is hereby incorporated by reference in its entirety as though fully and completely set forth herein.

Figure 1:
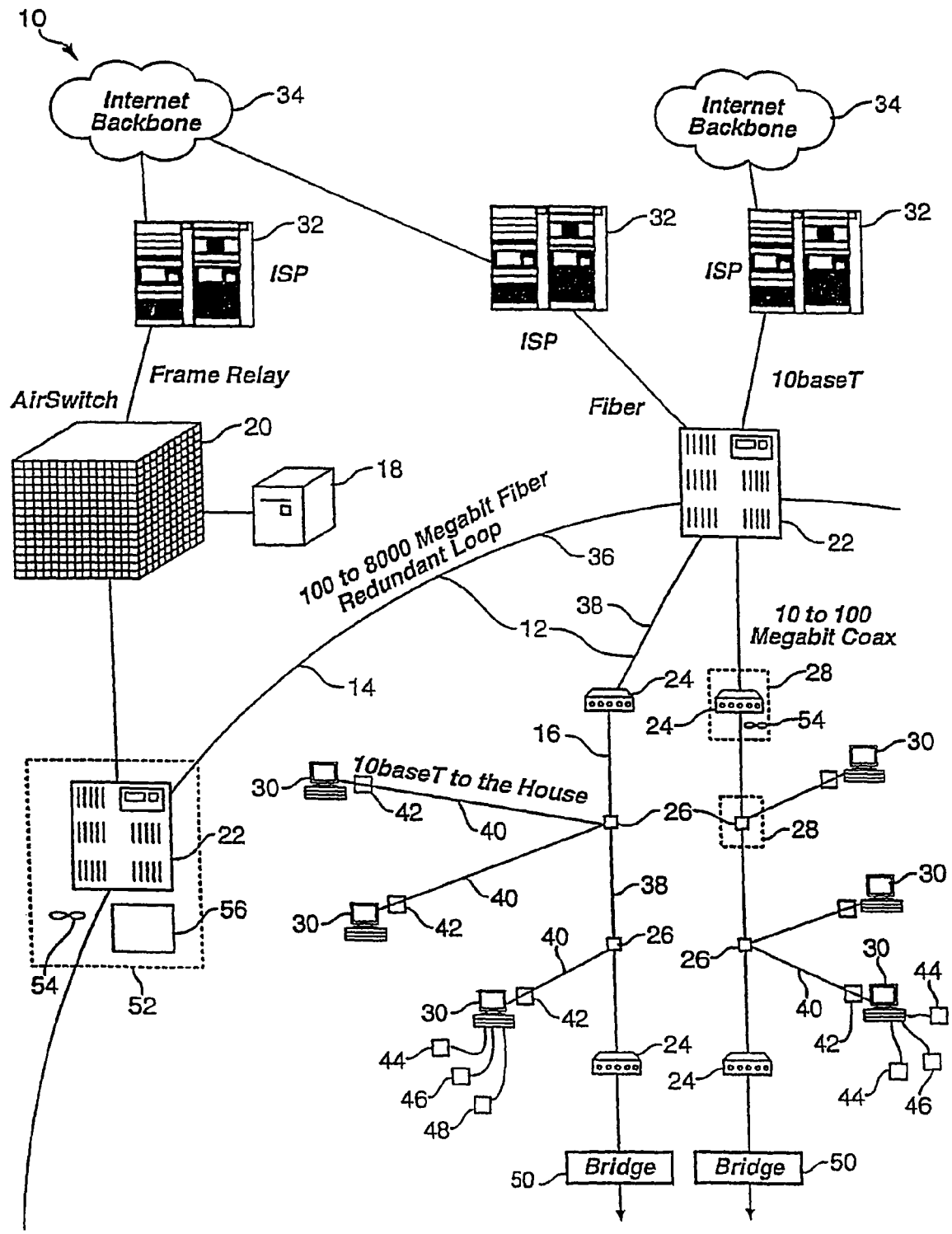
FIG. 1 is a schematic block diagram illustrating one embodiment of network system hardware for use with the present invention.

Referring now to FIG. 1, shown therein is a schematic block diagram showing various hardware components of one embodiment of a large-scale, high speed network of the present invention. Because the network is intended to serve a selected geographical region, it is referred to herein as a neighborhood area network (NAN) 10. The NAN 10, as depicted, includes a backbone 12, that is divided into two components. A first component is a fiber backbone 14 that is preferably adapted to transmit packetized data using standard optical communications protocols and technology. The fiber backbone 14 is preferably configured in a ring with incoming traffic traveling in a selected given direction.

Figure 3:
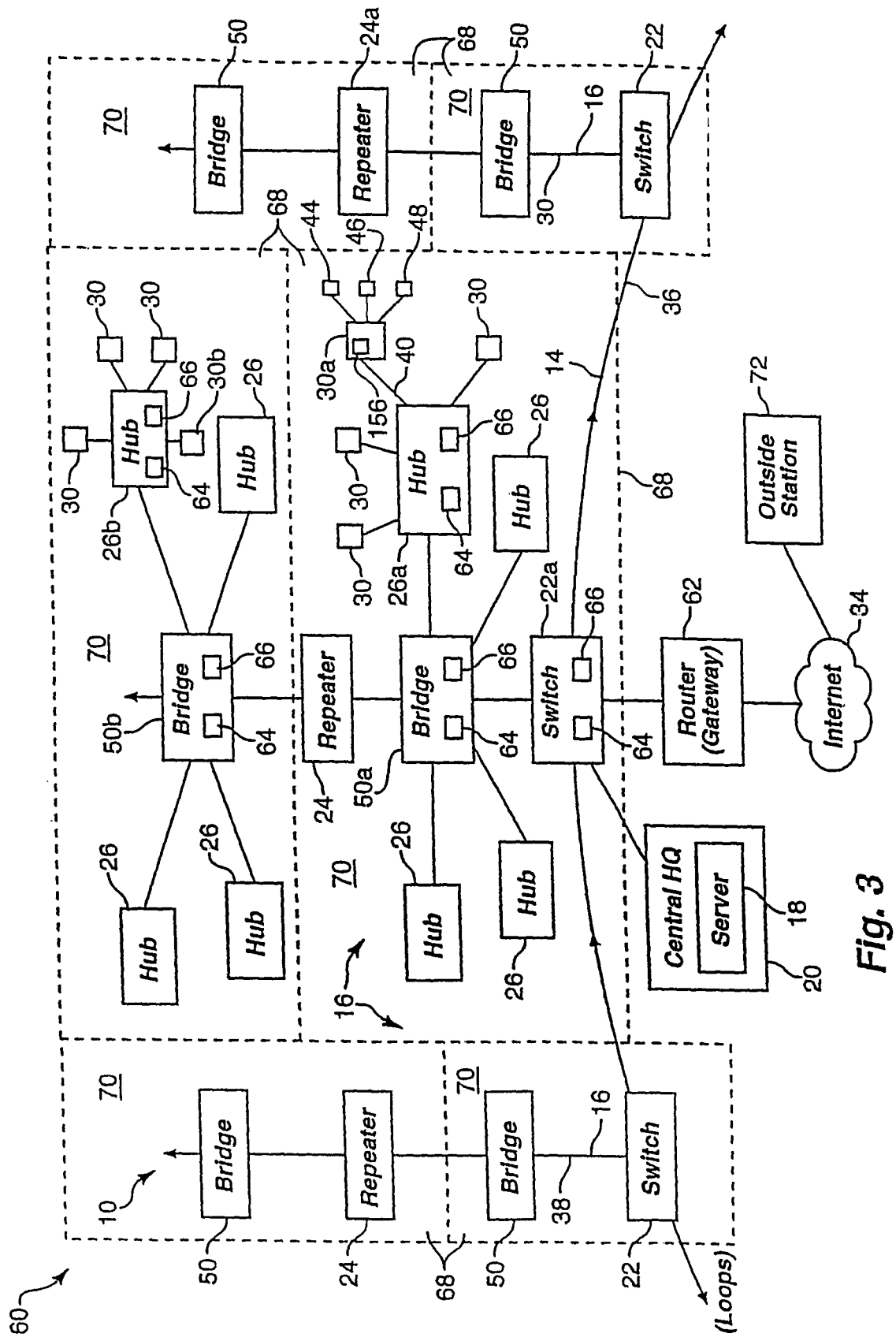
FIG. 3 is a schematic block diagram of one embodiment of a network architecture for use with the present invention.

A second component comprises a local backbone 16 that is preferably configured with a non-redundant branching structure and that is adapted to transmit data using radio wave signals. In the schematic depiction of FIG. 1, the physical locations of connections are represented, while an example of the actual branching structure is shown in FIG. 3.

The NAN system 10 in the depicted embodiment of FIG. 1 also includes a server 18 which may be located at a central headquarters office 20. One or more fiber switches 22 may be located within the fiber backbone 14. Indeed, the fiber backbone 14 may complete a circle around a neighborhood or other common geographical region which is intended to be networked in computer, voice, and or/video communication. The fiber backbone 14 may be provided with redundant loops in case one loop becomes inoperable.

The local backbone 16 preferably communicates with the fiber backbone 14 through one or more fiber switches 22. Each fiber switch 22 is preferably configured to examine packetized message traffic passing therethrough, and where a message is intended for a communicating station serviced by a portion of the local backbone serviced by the switch 22, route the message onto the local backbone 16. Each switch 22 also preferably routes locally generated traffic with external destinations to the fiber backbone 14 for receipt by other switches or gateways 108 to the Internet 34. The switches 22 preferably also convert communications between optical communications signals and radio frequency signals.

Within the local backbone 16, switching devices, including a series of repeaters 24, nodes 26, and bridges 50 are preferably deployed. In one embodiment, the local backbone is provided with coaxial cable 38 having a sufficiently high band width and having signals of sufficiently high amplitude that repeaters 24 are needed only every 300 feet or so. The nodes may comprise hubs 26 which, due to the efficient propagation of the NAN 10, can be located up to 30 feet from each communicating station 30.

Communicating stations 30 in one embodiment connected to the nodes 26, with Cat 5, twisted pair wiring 40 through a home connection box 42. Internet Service Providers (ISPs) 32 are shown connected to the NAN 10 through in several different types of gateways. An ISP 32 may connect through the central headquarters office 20 and from there to a fiber switch 22. Alternatively, an ISP may communicate directly with the fiber backbone 14 through a fiber switch 22. The ISPs provide access to the worldwide web and the Internet 34.

Each communicating station 30 may be provided with one or more home service boxes 44. The service boxes 44 communicate over the NAN 10 and provide interactivity from a remote distance. The service boxes 44 may comprise, for instance, power meters 46, security systems 48, and any number of electrical and mechanized devices, including appliances, sprinkling systems, synchronized clocks, etc.

The fiber switches 22 may be housed within containment units 52. The containment units 52 may be located inside or out of doors and are preferably provided with insulation and/or environmental control devices such as a fan 54 and/or air conditioning 56. The containment units 52 are preferably vented.

The repeaters 24, bridges. 50 and nodes 26 are preferably located within protective pedestals 28 which are also preferably vented, which provide a hardened outer shell, and which may be provided with fans 54 or other environmental control devices. The pedestals 28 may be mounted in the ground, or may be mounted from utility and/or power lines overhead. The pedestals 28 preferably provide some type of lightening protection such as a Faraday shield. The pedestals 28 are described in greater detail below with reference to FIGS. 7 and 8.

Figure 2:
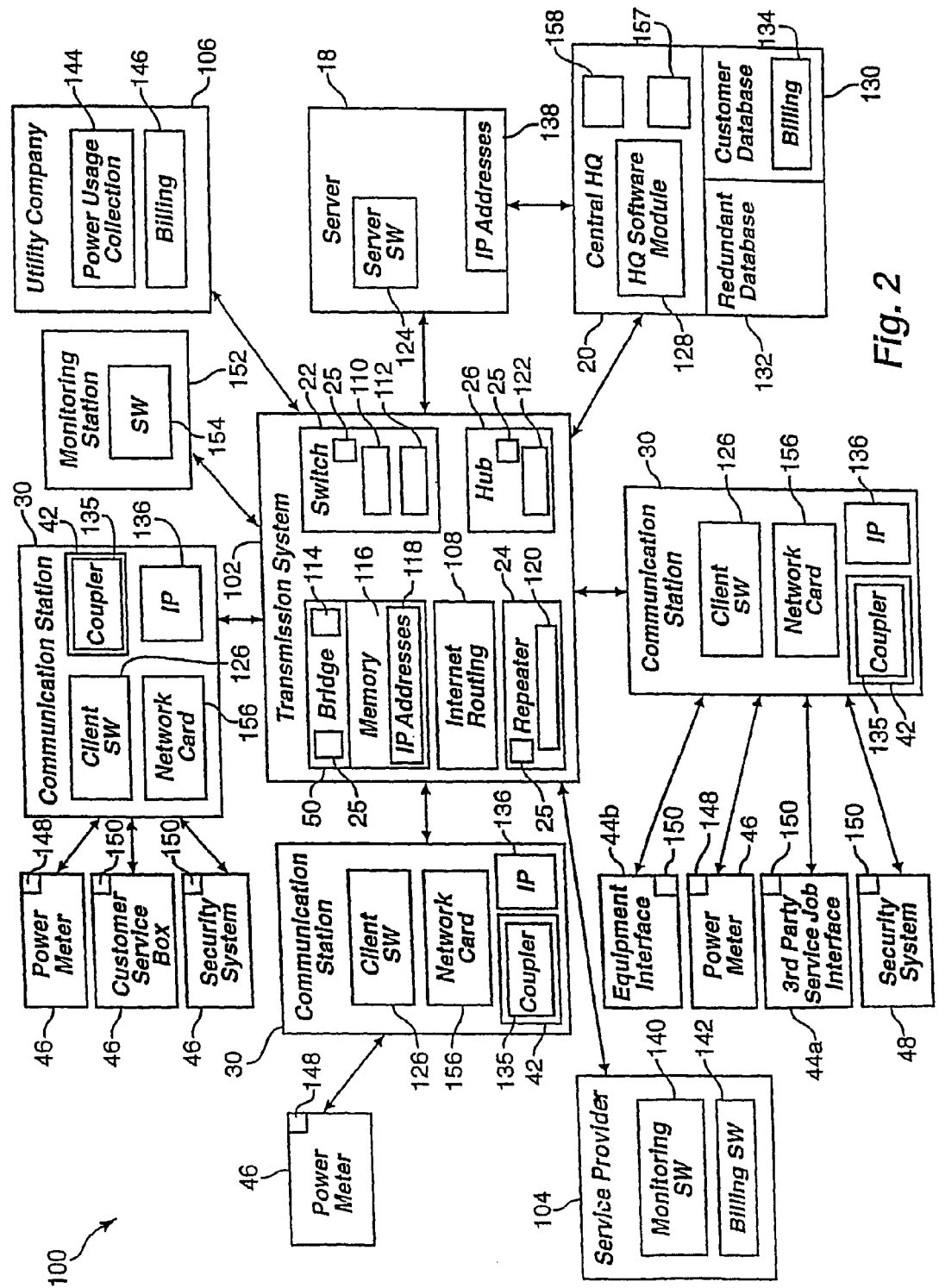
FIG. 2 is a schematic block diagram illustrating one embodiment of a system architecture for use with the present invention.

FIG. 2 is a functional block diagram illustrating a system architecture 100 including operative data structures and executable modules for controlling the operation of the hardware of the NAN 10 depicted in FIG. 1. The system architecture 100 controls the interactions of the various intelligent components of the NAN 10 of FIG. 1.

Accordingly, shown in FIG. 2 are the different modules and executables for operating the NAN 10. Included are a plurality of client stations 30 communicating over a transmission system 102. Other entities may also communicate over the transmission system 102. These include the central headquarters office 20, the server 18, a monitoring station 152, and service providers 104, including a utility company 106.

Referring now to the transmission system 102, one method of operation of the NAN to transmit information between the client stations 30 will be described. In one embodiment, the NAN backbone 12 is essentially routerless. That is, the system is operated at a large scale, but using the same principles as a small local area network. This is achievable due to the unique architecture and configuration of the NAN 10. Routers (62 in FIG. 3) are required only when connecting to outside entities, such as other NANs or the Internet 34.

Components included within the system 100 include the bridges 50, the switches 22, the repeaters 24, and the nodes, which in one embodiment comprise hubs 26. Also included within the system 102 is an Internet routing module 108 which routes traffic to and from the ISP's 32. The Internet routing module 108 operates as a gateway and may comprise a switch and a router 62.

The switches 22 are provided with software modules in the form of a switch routing module 110 and a switch conversion module 112. The switch routing module 110 is used to route traffic between the switches 22. The switch conversion module 112 is used to convert packeted traffic between the optical communications protocol and the radio frequency signals used within the coaxial cable lines 16. Thus, in preferred embodiments, each switch includes one or more protocol converters interfacing between fiber cabling and Cat5 twisted pair wiring.

The protocol converters translate the optical signals into radio frequency signals for transmission on the coaxial Cat5 cables. The radio frequency signals are in turn translated into digital signals by the network cards 156.

The Cat5 twisted pair wires lead into out of the switch 22 and connect to the protocol converters 112 and to repeaters 24. The repeaters 24 place the data packets on the coaxial cable 16. The Cat5 wiring may also lead directly to client stations 30 that are within 300 feet of the switch 22.

Traffic is routed in an efficient manner whereby the system 100 utilizes the high speed fiber cables 14 to as great a degree as possible routing packetized traffic to the switch closest to the communicating station 30 to which the message is addressed. Once the packet reaches the closest switch 22, it is routed through a repeater 24 onto the local backbone 12. Once on the local backbone 12, the packet passes to a bridge 50 and then to the node 26 closest to the client station 30 in a manner be discussed below with relation to FIG. 3.

The repeaters 24 are preferably spaced approximately every 300 feet in order to avoid over-attenuation of the signals carrying the data packets. The nodes 26 are placed within 30 feet of each communicating station 30.

The communicating stations 30 are preferably provided with client software 126 for enabling communications over the NAN 10. The NAN 10 communications medium is, in one embodiment, standardized Ethernet datapackets adhering to the Ethernet/OSI standards. In one embodiment, the data packets may be transmitted over the NAN 10 using merely MAC addresses of the low levels of the OSI model.

Client stations 30 which are new to the NAN 10 transmit an initial communication packet over the NAN 10 to the server 18. The server 18 in reply issues an IP address 136 to the client station 30 which is semi-permanent. Thereafter, the client station 30 has a semi-permanent IP address 136 which is changed only upon incidents such as the computer or network card of the client station 30 being changed.

The packets are routed through the switches 22, repeaters 24, and nodes 26, to the addressed client stations 30. The packets may be transmitted at a rate of 10 megabits per second due to the unique architecture of the NAN 10. This high rate of speed can be upgraded by a factor of 10 or even up to a factor of one hundred without having to redeploy the fiber cables 14, the coaxial cables 16, and the pair twisted wiring 40. This, again, is due to the unique architecture of the system.

The system architecture includes extending the distance a packet can travel up to between 3000 and 25000 feet and increasing the maximum tolerable packet acknowledgment time. This is accomplished in one embodiment by digressing from the IEEE standards.

For instance, the signals with which the packets are transmitted are amplified to a higher power than those on standard networks. This is accomplished by increasing the gain in the amplifiers that make the repeaters function. Additionally, the reception equipment is preferably more sensitive and able to capture a more degraded signal than standard network equipment.

The fact that the system operates on a baseband concept wherein all of the cable bandwidth is restricted to one channel rather than being divided into multiple channels allows for a higher bandwidth and greater power from the repeaters. This allows for collision detection over the cable 38 and for a release of the collision detection at a much lower level. Thus, voltage spikes are detected and ignored so that lower level collisions are not detected and the large level collisions can be detected. The incidences of these collisions are highly reduced due to the high bandwidth and direct routing of the system 100.

Collision detection is preferably accomplished through voltage detection and timed resends and is adjusted to compensate for the increased sensitivity of the repeaters.

The repeaters 24 are provided with software or other logical circuitry 120 therein which allows the repeaters 24 to be semi-intelligent. The repeaters 24 transmit the fact that they are functioning, as well as information regarding the amount of traffic passing therethrough, in order to better manage the NAN 10. Otherwise, the repeaters 24 merely pass the packets through and do not provide any switching function, merely increasing the amplitude of the signals carrying the packets. As mentioned, the repeaters 24 are, in one embodiment, placed every 300 feet across the local backbone 16.

The hubs 26 route the packetized traffic through the Cat5 twisted pair wiring 38 to the communicating stations 30. Internet routing 108 may also take place to route the Internet communications to the ISPs 32. Communications with external stations over the Internet 34 may be conducted with a permanent IP address to get the messages within the NAN 10, wherein the outside data packets are routed using MAC addresses. Additionally, stations 30 without permanent IP addresses may communicate through the use of a masqueraded IP address using a permanent IP address to get into the NAN and the semi-permanent IP addresses 136 issued to each client station 30 in a manner that will be discussed below in greater detail.

The bridges 50 are provided with software 114 and are also provided with a memory containing a bank 118 of the IP addresses 136 of each client station 30. The bank 118 also includes, for each corresponding IP address 136, information regarding the location of the client station 30 to which the IP address 136 is assigned.

Accordingly, the bridges limit communications to only a particular portion of the network 10 to which the communication is addressed. Thus, the bridges 50 effectively partition the NAN 10. A further function of the bridges 50 and the switches 22 is to eliminate unwanted communications. For instance, in one embodiment, broadcast packets and messages are forbidden. Accordingly, each switch 22 and bridge 50 may be provided with a traffic filter module 160 as depicted in FIG. 4.

Figure 4:
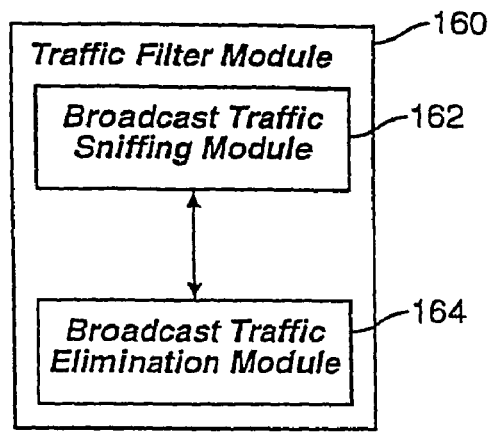
FIG. 4 is a schematic block diagram of one embodiment of a traffic filter module for use with the present invention.

Referring to FIG. 4, the traffic filter module 160 is used to eliminate certain types of traffic that may not be routed over the NAN 10. Accordingly, the NAN 10 is defined as determining what types of communications can not be routed rather than determining what types can be routed, as in the prior art. Within each traffic filter module 160 may be a broadcast traffic sniffing module 162. The broadcast traffic sniffing module 162 examines each information packet 165 (shown in FIG. 4A) and checks certain fields 171 which indicate that the packet 165 is broadcast data. When the traffic sniffing module 162 determines that the packet 165 is broadcast traffic, it then initiates the traffic elimination module 164 which eliminates the broadcast packet 165.

The bridges 50 and switches 22 in one embodiment detect broadcast traffic by detecting an empty field 171 within the MAC address 170. Alternatively, the broadcast traffic sniffing module 162 may detect a series of addresses at a certain level such as 255, 255, 255, 255 to detect a broadcast packet 165.

Thus, because the NAN 10 eliminates unwanted traffic and restricts traffic to only those portions of the NAN 10 through which the packet 165 must travel to reach the addressed communication station 30 in the most efficient manner, much extraneous traffic is eliminated. This, combined with the higher speeds of the present invention, allow the NAN 10 to be operated as if it were a local area network but on much grander scales, indeed, even to include entire neighborhoods or municipalities. Additionally, because of this, the NAN 10 is suitable for use in geographical areas covering extensive distances that are merely geographically or community interest related, rather than being business, government, education or otherwise related. Thus, the NAN system 10 can be by financed at least in part by the service providers which will benefit from the efficient communication of the NAN 10.

Referring now to the service providers 104 of FIG. 2, an example of such a service provider is a utility company 106. In one embodiment, the utility company 106 is a power company. Thus, for example, the power company can communicate over the transmission system 102 on the NAN 10 with each client station 30. Within each client station 30 is one or more service boxes 144 having therein customer service software 150.

The customer service software 150 might, in one instance, comprise power meter software 148 within a power meter box 46. The power meter software 148 may transmit power usage through the NAN 10 back to the utility company 106. The utility company 106, with a power usage collection module 144, receives the power usage data and transmits it to a billing module 146. The billing module 146 then bills the customer at the communicating station 30 over the transmission station 102. The payment of the bill may also pass through the transmission system 102, thus passing through the NAN 10 back to the utility company 106. Of course, utility companies other than the power company may also use this system of data collection billing and payment receipt.

Other types of service boxes 144 may also contain customer service box software 150. For instance, the security system 48 may contain therein software which notifies the monitoring station 152 of any irregularities. Software 154 within the monitoring station 152 may monitor the data transmitted by the security system 48. For instance, this data might include home security system data indicating that a break-in has occurred. The security system 48 may also indicate the occurrence of a fire, and may transmit full video surveillance data back to the monitoring station 152. The monitoring station 152 or a similar station may also monitor the contents of the NAN 10 in order to eliminate illegal traffic. Pornography or other types of traffic may likewise be eliminated.

Each client station 30 as mentioned, preferably communicates at the MAC layer within the NAN 10. The client stations 30 may also be provided with a semi-permanent IP address for communications external to the NAN 10. The server 18 is provided with server software 124 which maintains a bank 138 of the IP addresses 136. The server 18 thus issues the IP addresses 136 and also maintains a binding between the MAC layer communications and the IP addresses 136. These bindings are transmitted to the switches 22, bridges 50, and any other equipment with a need to know the IP addresses 136 of the client stations 30.

Consequently, the server 18 is not necessary other than for issuing IP addresses and maintaining bindings, and indeed, if the server 18 were to go down, the transmission system operating on the NAN 10 could continue to operate. New client stations 30 would merely not be able to receive an IP address.

The central headquarters office 20 preferably contains therein a headquarters software module 128. The headquarters software module 128 may conduct monitoring and billing types of operations. Thus, a customer database 130 may be maintained therein and may coordinate with a billing module 134. A redundant database 132 is also preferably included. The redundant database 132 may be located at a distant site such that it maintains a copy of all data in the case of a failure of the customer data 130. Synchronizing information may pass between the customer database 130 and the redundant database 132 over the NAN 10 with the use of the transmission system 102.

Billing information may be generated and stored within the billing module 134 and may be transmitted to communicating stations 30 over the transmission system 102. The customer database 130 may maintain records including records of which customers are behind on their payments. If the customers are behind, the client station 130 of that customer may be denied services in part or in full of the NAN system 10. These services include, in one embodiment, Internet service.

The communicating stations 30 are preferably provided with standard network cards 156 which transmit through the home connection box 42. The client software 126 residing at the communicating stations 30 preferably maintains the client's IP address 136 and receives and generates data packets (shown at 165 in FIG. 4A) with which information is transmitted over the transmission system 102. The client software 126 may provide many various types of functions, including video phone communication, audio, and video transmission, payment of bills, ordering of on-demand video, transmission of home security information, etc.

A power coupler 135 may be provided within or in communication with the home connection box 42. The power coupler 135 preferably conditions incoming power from a power source at each communicating station, combines the power and network connection, and provides a simple manner of connecting the twisted pair wiring to standard computer cabling, preferably Ethernet cable, which passes to the computer at the communicating station 30. In one embodiment, the twisted pair wiring is provided with a twisted pair for transmission, a twisted pair for reception, and a twisted pair carrying AC to the hub 26, as will be discussed in greater detail below with reference to FIGS. 5 and 6.

The hub 26 is in one embodiment provided with a power concentrator 25 which provides power conditioning and power delivery to the hub 26. The power concentrator receives power from the power coupler 135 of the communicating stations 30. Preferably the power concentrator 25 receives power from two or more stations 30 and passes the power on to the hub 26 or other switching device. A Power concentrator 25 receives power through a transformer connected to a wall socket at the communicating station 30. In one preferred embodiment, four houses share a hub and provide power to the hub. The hub bleeds power out of the four transformers at a time, but can receive power from less than all of them and be at a fill power level. This redundant power supply scheme ensures that the hub 26 continues operating even if one of the power sources, i.e., one of the communicating station 30, goes down. Thus, AC power is received from the communicating station 30 through the power coupler 135 to the power concentrator 25. In addition, all switching equipment may be powered cooperatively in this manner and may be provided with power concentrators 25.

In one embodiment, the AC power is received directly from a power meter at the communicating station 30. The power from the communicating stations 30 may be provided individually or collectively to the switches, bridges, repeaters, router, hubs, and any other switching equipment of the NAN. Additionally, power meters not located at communicating stations 30 may be utilized to provide power to the hubs 26 and other switching equipment.

In one embodiment, the communicating stations 30 or the hubs 26 comprise a power meter monitoring hub 26. The power meter monitoring hub 26 may comprise an RF receiver and an 8-bit microcontroller as well as an RS 232 communications interface and a power supply. The hub may also contain up to four 10-base T ports. On-site configuration is provided by an RS 232 port. Under this embodiment, the monitoring hub receives power consumption data from power meter transmitters and passes it on to the utility company 106 over the transmission system 102.

Each power meter 46 in this embodiment provided with a power monitoring transmitter. The transmitter may be comprised of a PIC microcontroller, a 418 megahertz UHF transmitter, a photo-reflective sensor, and an off-line power supply. The transmitter may use the photo-reflective sensor to monitor rotation of the power meter disk and store the information in nonvolatile memory in the microcontroller. The transmitter transmits the power usage information to the power meter monitoring hub along a 418 megahertz RF link.

In one embodiment, the coaxial cable, as well as the 10-base T wire, is housed within a protective conduit. The system may operate with Linux using an IP chain and masquerading which is considered more effective than using a proxy server.

The bridges 50, in addition to eliminating broadcast traffic, may also receive and regenerate the packets 165 at a higher power level. The repeaters 24 preferably merely amplify the signals carrying the packets 165 and do so without any delay, while the bridges may slow down the packets somewhat.

Referring now to FIG. 3, shown therein is a functional block diagram of a NAN hierarchy scheme 60. Within the scheme 60 is shown the fiber backbone 14 looping in a circuitous manner to form a ring. Within the fiber backbone 14 is a plurality of switches 22. A central switch 22a is shown connected with the central headquarters 20 and through a router 62 to the Internet. Thus, the fiber backbone 14 comprises an outer circuitous backbone. It should be noted that the NAN 10 may have a plurality of gateways 62. Because of the plurality of gateways, any number of ISP providers 32 may provide service to the NAN 10. Other types of service providers and outside entities may also access the NAN 10 through the gateways 62.

Emanating from the switches 22 are components of the local backbone 16 which are arranged in a branched configuration. Thus, shown branching out from each switch 22 is a series of bridges 50, repeaters 24, and hubs 26. Each bridge 50 separates and services a plurality of hubs 26.

Thus, an incoming packet 165 received, for instance over the Internet 34, passes through the router 62. The router 62 uses an IP address 169 shown in FIG. 4a to determine that the packet is local to the NAN 10. For instance, the IP address may be assigned to the NAN 10 or to the router 62 specifically under a masquerade scheme that will be described.

Figure 4A:
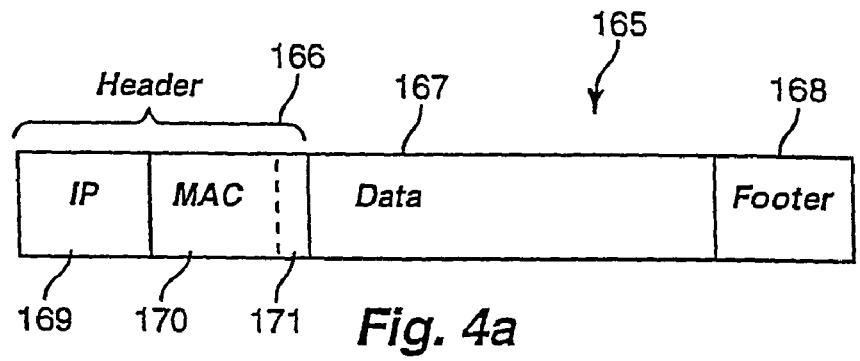
FIG. 4A is a schematic representation of one embodiment of a communications packet of the present invention.

Once the packet 165 reaches the NAN 10, it is routed using a MAC address 170 of FIG. 4a. After passing through the router 62, the packet 165 is received by the central switch 22a. As shown in FIG. 4A, the packet 165 comprises a header 166, a data portion 167, and a footer 168. The header comprises the address of the addressed communicating station 30. The footer contains redundancy information to make sure the packet 165 was properly received. A cyclical redundancy check (CRC) may be used using information in the footer for acknowledgment that the packet 165 was received and has not been degraded.

Within the header 166 may be both an IP address 169 and a MAC address 170. The MAC address 170 refers to a unique number given to each network card 156 of FIGS. 2 and 5. The IP addresses 169 are administered by the Internic agency and are addresses utilized under the TCP/IP protocol. Each station has a unique MAC address. Additionally, each station may have a unique IP address 169.

Nevertheless, because IP addresses 169 are becoming scarce and difficult to procure, a masqueraded system may be employed wherein the router 62 contains a routable IP address or several routable IP addresses and stations 30 within the NAN 10 are addressed by the routable IP address of the router 62 outside the NAN 10. Once addresses containing the masqueraded IP address reach the NAN 10 at the switch 22a, the MAC address 170 may then be used to route the packet 165 within the NAN 10. Indeed, within the NAN 10, routing is preferably exclusively conducted using the MAC address 170.

When communicating on the MAC level, a communicating station 30, in one embodiment, uses a protocol such as an ARP request. The "AR-P" request is an address revolution protocol. The ARP protocol talks to the network cards looking for the MAC address. The use of an ARP-type address protocol by the NAN 10 does not adhere exactly to the ARP address protocol but is similar to it.

Thus, the server 18 may be characterized as a modified DHCP server but does not broadcast DHCP as with the prior art systems, though it does maintain the IP-MAC address binding and notifies all subscribing components of that binding. Under this arrangement, when a communicating station 30 comes on-line and receives the non-routable IP address from the server 18, it then binds the IP address. In one embodiment, this is done by populating its registry with the IP address. That is, the IP address is bound to the TCP/IP protocol stack. This IP address is used for TCP/IP protocol communications with stations 72 external to the NAN 10. As discussed, all internal communications are preferably routed using the MAC address.

Of course, the communicating stations 30 could also receive permanent IP addresses either from the server 18 or directly from Intemic. These permanent, routable IP addresses may also be maintained within the binding of the server 18.

Figure 4B:
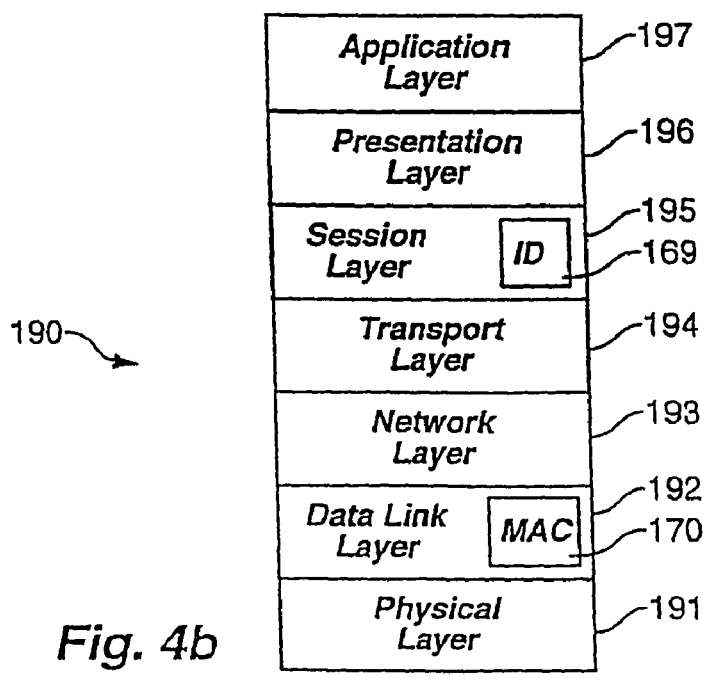
FIG. 4B is a schematic representation of an OSI seven layer model.

Preferably, hubs, bridges and switches work on only the lower two levels of the OSI model of FIG. 4b. When a packet 165 is addressed to go outside of the NAN-10, it is sent to the router 62 which acts as a gateway to the Internet 34 and passes the packet 165 outside the NAN 10. The IP addresses within the communicating stations 30 communicate through virtual ports on the communicating stations 30 but preferably not through the same communicating ports as traditional DHCP protocol standards.

Additionally, the IP addresses are semi-permanent. That is, the communicating stations 30 maintain a single IP address for external communications and do not flood the NAN 10 with requests for DHCP servers to receive IP addresses from. Indeed, because of this substantially, only direct routed traffic exists on the neighborhood, and all broadcast traffic is substantially squelched. Additionally, all traffic is partitioned within its own area and does not travel across the entire network. For this reason, there are substantially less collisions because traffic is much more localized. This also allows the network to service many more communicating stations 30.

The OSI model 190 is shown in FIG. 4*b*. As shown therein, the OSI model comprises a first layer 191 known as the physical layer. A second layer 192 is known as the data link layer and it is this layer that predominantly deals with the MAC address 170. A third layer is referred to as the network layer, a fourth layer 194 is referred to as a transport layer, and a fifth layer 195 is referred to as a session layer. The session layer 195 primarily deals with the IP address 169. A sixth layer 196 is referred to as the presentation layer, and a seventh layer 197 is referred to as the application layer. Within the seven layer OSI model, the upper levels allow two communicating stations, one assigned as a client and one assigned as a server, to coordinate communications with each other.

The NAN 10 may be configured to communicate only on the second layer 192 within the loop of the fiber backbone 14. For example, the router 62 may be configured to receive IP addresses 169 from the Internet 34, and provide only MAC addresses 170 to the switch 22. IP address resolution may be handled by the ISP 32 or other suitable entity. Thus, communications between the communication stations 30 would occur using only MAC addresses 170, without the need to send an IP address 169 within each packet 165.

The bridges 30 may then be omitted, and the hubs 26 and repeaters 24 may be replaced by switches 22 configured to handle only the MAC addresses 170. Such an architecture would provide more rapid data transmission throughout the NAN 10, since there is less information in each packet 165 to deal with. In addition, installation and configuration of the NAN 10 would be simpler because switches 22 may be installed without any need for hubs 26, repeaters 24, and bridges 30.

Referring back to FIG. 3, once message traffic 165 is received from the router 62 to the switch 22*a*, the switch 22*a* maintains the packet 165 momentarily in a buffer 164 and refers to a database 66 to determine whether the MAC address 170 is local to a partition 169 belonging to the switch 22*a*. Switch 22*a* makes this binary determination, and if the answer is yes, passes the packet 165 to a first bridge 50*a*.

If the answer is no, that is, the traffic is not local to a partition 168, the switch passes the packet 165 in a given direction to a subsequent switch 22. In the depicted embodiment, the given direction is clockwise. Upon passing the packet 165 on, a subsequent switch 22 receives the packet 165 and similarly examines the packet 165 to determine whether it is local or external to a partition 168. If the packet is local to the partition 168, the switch 22 will pass it on to a bridge 50 within a partition 168 to which the switch 22 belongs. If the packet 165 is addressed external to the partition 168 of the switch. 22, the switch 22 passes the packet 165 in the given (clockwise) direction to a subsequent switch 22.

Presuming that the packet 165 was local to switch 22*a*, switch 22*a* passes the packet to a first bridge 50*a*. The bridge 50*a* then holds the packet 165 temporarily in a buffer 64 and refers to a local database 66 to determine whether the packet 165 is local or external to the bridge 50*a*. If the packet 165 is local to the bridge 50*a*, the bridge 50*a* determines which of the hubs 26 connected with the bridge 50*a* the packet 165 must be routed through.

If the packet 165 is addressed external to the bridge 50*a*, the bridge 50*a* passes it to a subsequent bridge 50*b*. The bridge 50*b* then receives the packet 165 within a buffer 64 and examines its database 66 to determine if it the packet is addressed to a local station 30. If it is not, it passes it on to subsequent bridges 50 (not shown) in the branching structure of the local backbone 16.

The bridges 50 are typically separated by one or more repeaters 24 to amplify the radio frequency (RF) signals which contain the packets 165. Referring now back to bridge 50*a*, if the packet 165 was local to bridge 50*a*, it determines which of the hubs 26 to pass it to. Presuming that the packet 165 was addressed to a station 3 O*a* within a hub 26*a*, the bridge passes the packet to the hub 26*a*. The hub 26*a* briefly maintains the packet 165 within a buffer 64 and examines its database 66 to determine which of the subscribing communicating stations 30 the packet 165 belongs to. In this case, it determines that the packet belongs to station 30*a* and places the packet on a line 40 to be received by a network card 156 located at the communicating station 30*a*. A similar process would occur with every bridge 50. Thus, for instance, if the packet were addressed to a station 30*b*, the bridge 50*b* would receive the packet and transmit to the hub 26*b*, which would receive the packet 165 and transmit it to the communicating station 30*b*.

Inter-NAN communications are even more simplified. For instance, if the communicating station 30*a* wishes to communicate with the communicating station 30*b*, client software 126 would prepare the packet 165 and place it through the network card 156 onto the NAN 10. The packet 165 would be received by hub 26*a* which would in turn transmit the packet 165 to the bridge 50*a*. The bridge 50*a* would examine the packet once again to determine whether it is local or external to the bridge 50*a*. If it is locally addressed, the bridge 50*a* transmits to the appropriate hub 26 connected thereto. If it is not, it directs the packet 165 to another bridge 50 or to the switch 22*a*, depending on the MAC address 170.

The switching equipment, such as the switches, bridges, and hubs, preferably use a binary tree sorting algorithm to sort through addresses in the attendant databases 66 to determine the location of stations 30 addressed by the packets 165, which greatly enhances the speed thereof. The binary tree, rather than being just a one dimensional look-up table or bubble sort, is branched and allows for larger databases without significant propagation delays. The binary tree is implemented, in one embodiment, using the Nikolas Wirth style that is known in the art.

Note that each bridge 50 also preferably contains its own sub-partition 70 in the partition 68 of the switch 22 to which it subscribes. In this case, when a bridge, such as bridge 50 determines that the packet 165 is local to the partition 68 but not within its own subscribing hubs 26, the bridge 50*a* passes the packet 165 on to the bridge, e.g. bridge 50*b*. The bridge 50*b* then examines the packet 165 and determines that it belongs to the hub 26*b* and passes it on to hub 26*b*. Hub 26*b* in turn examines the packet 165 and passes it on to the communicating station 30*b*.

If a communicating station 30 such as the station 30*a* wants to communicate with a computer or entity 72 outside of the NAN 10, it addresses the packet 165 using the IP address of the entity 72. If the outside station 72 wishes to communicate with the station 30a, it also uses an IP address 169 to get into the NAN. This IP address 169 may be either a permanent IP address received from the Internic agency or a masqueraded IP address attributable to the router 62. The outside station 72 sends any return messages using this IP address. If the masqueraded IP address is used, the router 62 passes the packet 165 to the switch 22a, which then examines the MAC address 170 without having to refer to the IP address. Thus, one difference between bridges 50 and the routers 62 of the present invention is that a bridge 50 reads only at the MAC level while a router 62 reads at the IP level.

The outside station 72 could also be part of a NAN other than the NAN-10. The outside station 72 could communicate using MAC addresses to other outside stations 72 within its own NAN, but once it wished to communicate with an entity outside its own NAN such as the communicating station 30a, it then must use an. IP address to pass packets 165 through the Internet with the use of routers 62.

As presently contemplated, each NAN 10 may have 10,000 or more communicating stations 30. A community having more than 10,000 locations wanting to subscribe to the NAN 10 would require more than one NAN 10. Additionally, under the present system, this maximum number may be increased by increasing the speed of the local backbone 16. The speed of the local backbone may be increased up to, for instance, a gigabit per second of throughput without having to reinstall the communicating lines. To increase the number of subscribing communicating stations 30 within a NAN-10, the firmware constituting the software within the client stations server, hubs, bridges and switches are replaced, in an operation that is substantially transparent to the communicating stations 30.

Stations within the different NANs preferably communicate with each other over the Internet, as discussed. Nevertheless, within each NAN communications are routerless in the preferred embodiment.

Presently, the standard for communications on the inner backbone 16 is 10-base-T, whereas the fiber communications on the fiber backbone 14 are set at 100-base-T. NAN 10 communications preferably utilize the Ethernet 802.3 standard which is the standard presently relied upon by most Internet and network organizations. The Ethernet 802.3 standard is used in one embodiment of the NAN for packet encapsulation for transfer of the packets 165 over communication lines 36, 38.

In order for a new communicating station 30 to be admitted to communicate on the NAN 10, it must first establish communications with the server 18. The server 18, as described, maintains a binding between IP addresses and MAC addresses. The client software 126 which is installed on every communicating station 30 provides the communicating station 30 with the proper MAC address of the server 18. Thus the communicating station communicates with the server 18 to receive a localized non-routable IP address for use in communications external to the NAN-10.

In one embodiment, the communicating station 30 may be given a permanent IP address issued by Internic or may be given a non-routable address and use the masquerading procedure discussed above. Additionally, there may be several different types of IP addresses issued. As discussed, routable and non-routable IP addresses may be issued as well as filtered IP addresses that filter content received from the Internet. Additionally, an IP address may be partially or fully functional depending on whether the communicating station 30 has paid a monthly or yearly fee.

Every station 30 checks in with the server 18 at the initial login in one embodiment, but if the server 18 is not functioning, the stations 30 may still continue to operate with the previously issued IP address. E-mail messages may be sent to a permanent IP address, or may be routed in the manner of outside station 72 communications as discussed above.

In addition to the hardware and systems described above, appropriate new hardware, software, and systems may be included in the NAN to enable prioritization of traffic and reduction of broadcast traffic through address caching. FIGS. 5 through 19 are presented to illustrate such hardware, software, and systems, as well as the methods utilized for traffic prioritization and reduction.

In the following figures, a number of definitions are relevant. A "data transmission" is simply a digital or analog signal transmitted to a destination. A "packet" 165 is a data transmission bundled in suitable form for delivery over the Internet 34, as depicted in FIG. 4a. A "switching station" 200 refers to any device that carries and manages data transmissions between multiple ports. Thus, switches 22, hubs 26, repeaters 24, and bridges 30 may all be switching stations.

However, the packet prioritization and traffic reduction methods of the current invention are well suited to use with switches 22 described above. A "property" of a data transmission is simply any characteristic of the data transmission that can be obtained by a switching station. This includes not just information encoded in the packet 165, but also any other information the switching station could obtain, such as the identification of the port through which the packet 165 entered, characteristics of other packets 165 arriving with the packet 165, etc.

"Relative importance" of a data transmission or a packet 165 refers to how important it is that the data transmission reach its destination rapidly. This is relative to the importance of other data transmissions sent through the NAN 10. "Priority" is a related term. The priority of a packet is a designation that determines whether the packet is transmitted before or after other packets. This determination must be made when not all can be simultaneously transmitted, as is the case when multiple packets must go through a single outgoing port. Thus, the relative priorities of multiple packets may be compared to determine a "transmission order" of the packets.

Priority may be quantified with a gradation of values, or may be boolean, i.e., "high priority" or "low priority." A "threshold value" may be used to obtain boolean priority with reference to a certain value of the property. For example, if the property of the data transmission is above the threshold value, priority of the data transmission is high, and where the property is equal to or less than the threshold value, priority is low.

A "database" is simply an ordered listing of data stored for future retrieval in a memory device. A "destination" of a data transmission or packet 165 refers to an ultimate, terminal destination, rather than to locations of switches en route to the destination. Thus, a destination MAC address is the address to which a packet 165 will ultimately be transmitted. Likewise, an "origin" is a location from which the packet first originated, as opposed to switches upstream of the switching station under analysis. "Location" refers to any origin or destination on the NAN 10, hence, any communication station 30 may be encompassed within the word "location."

A "computer-readable medium" is any physical object that can store information in a form directly readable by a computer. Thus, magnetic, optical, and electrical storage devices are all contemplated, as well as any other method of storing information directly accessible to a computer. Hard disks, floppy disks, CD/DVD ROM drives, RAM chips, punch cards, and the like are all examples of computer-readable media. "Instructions" are simply steps to be carried out by a processor, located within a computer-readable medium. The instructions may be provided by hardware, software, firmware, or any suitable combination thereof.

A "switching system" includes a switching station and any other components added to improve the quality of switching, such as a prioritization system or traffic reduction system. A prioritization system is an apparatus that acts to assign priorities to data transmissions in a network such as the NAN 10. A traffic reduction system is an apparatus that reduces unnecessary traffic on a network.

Figure 5:
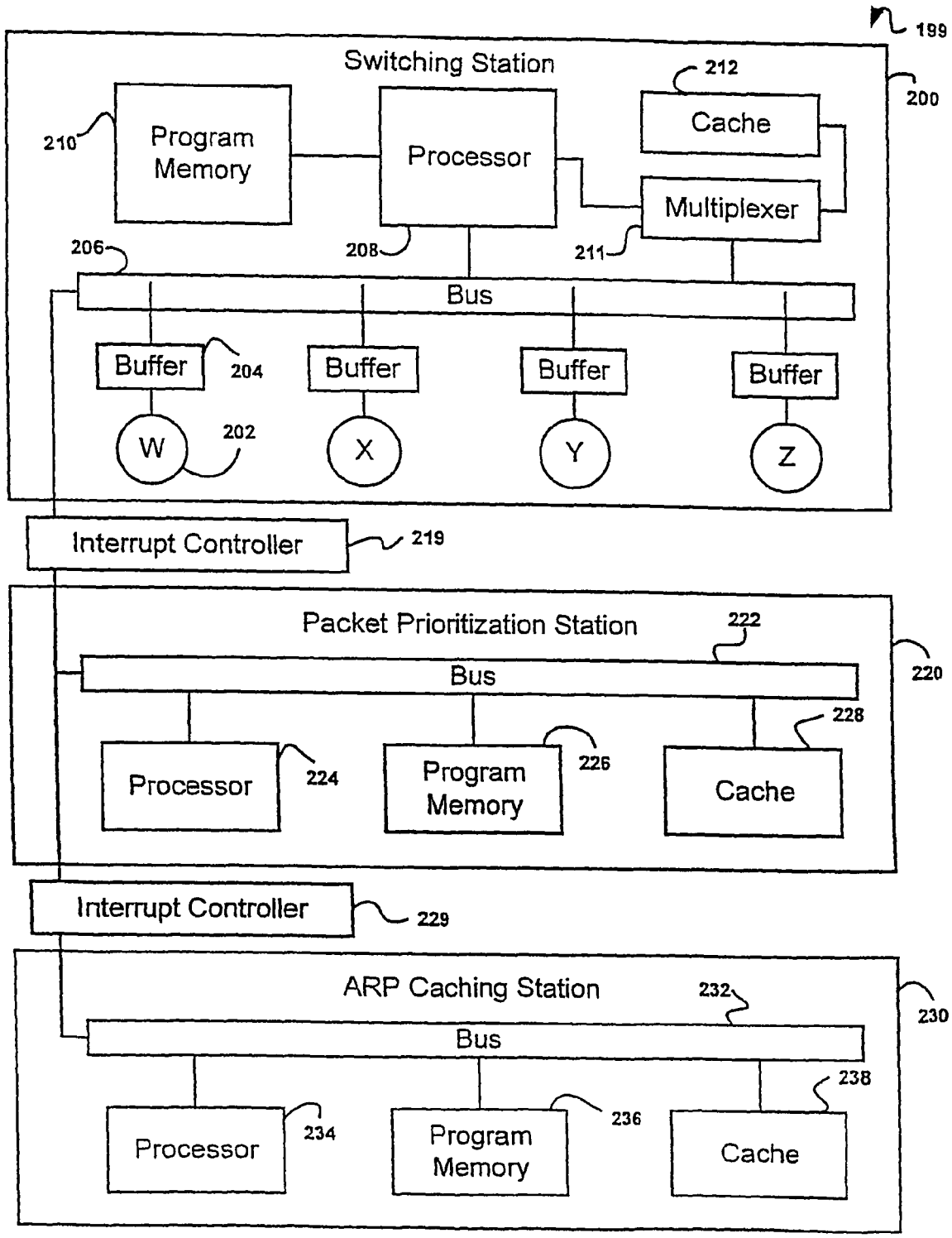
FIG. 5 is a schematic block diagram of one embodiment of a switching station, a packet prioritization station, and an ARP caching station suitable for use in the present invention, linked by interrupt controllers.

Referring to FIG. 5, one embodiment of a switching system 199 is shown, including a switching station 200 with hardware suitable for packet prioritization and traffic reduction through ARP caching. Packet prioritization and ARP caching may function independently of each other; therefore, a NAN 10 may carry out one method, yet not the other. Different switching stations 200 within a single NAN 10 may be differently configured to carry out packet prioritization, ARP caching, both methods, or neither one. Switching stations 200 with few communication stations 30 connected may, for example, derive less benefit from packet prioritization and ARP caching than those with many communication stations 30.

The switching station 200 has a plurality of ports 202, preferably from four to twenty-four in number. Each port 202 connects to one of the communication lines 38, which preferably provide full-duplex (i.e., simultaneous, two-way) data transmission. Thus, each port 202 may simultaneously send and receive data. Consequently, the terms "outgoing port" and "incoming port" refer equally to all of the ports 202, and simply delineate what the function of the port 202 is within the process being described. Each port 202 preferably has a buffer 204 to store incoming packets 165 from the port 202. These may be stored in the form of a first-in, first-out (FIFO) stack, so that packets 165 are queued up to be removed from the buffer 204 for processing in the order in which they were received.

Each buffer 204 is connected to a bus 206, which operates to transfer data to various components of the switching station 200 at a certain bus speed. A processor 208 connects to the bus 206 to process and manipulate data from the buffers 204. The processor 208 may be of any known type, such as a standard microprocessor, reduced instruction set computing (RISC) processor, field programmable gate array (FPGA), or application-specific integrated circuit (ASIC).

A microprocessor is capable of performing a wide variety of instructions, but is not highly specialized to perform any specific instruction set. A RISC processor is more specialized, but is still designed to carry out a comparatively wide variety of instructions. An FPGA is reconfigurable to carry out specific task sets, but is not as fast as an ASIC, which is highly specialized, but not reconfigurable. The ASIC contains a number of logic gates that are fixed in place, and are not reprogrammable. Since the switching station 200 will always perform a limited set of instructions, an ASIC is an ideal choice for the processor 208. Due to its highly specialized nature, the processor 208 in the form of an ASIC may operate at a speed of 8.4 Gigahertz or greater, thus permitting data transmission through the switching station 200 with very little delay.

The processor 208 is connected to a program memory 210, which contains instructions or reference data for the operation of the processor 208. Although many instructions of an ASIC are built into the configuration of gates used, and therefore hard-coded into the processor 208, certain information or instructions needed by the processor 208 may be stored in the program memory 210 separate from the processor 208. The program memory 210 may optionally be omitted, if the processor 208 is configured to contain all needed instructions and information.

The program memory 210 is situated within a computer-readable medium of any suitable type, such as one or more standard DIMM (Dual In-line Memory Module) or SIMM (Single In-line Memory Module) random access memory (RAM) modules, programmable read-only memory (PROM) modules, electrically erasable PROM (EEPROM) modules, static RAM (SRAM) modules, flash RAM modules, and the like. However, the program memory 210 is preferably of a nonvolatile type, so as to retain information in the event of a loss of electric power to the switching station 200. Additionally, the program memory 210 is preferably read-only to avoid any alteration or corruption of information in the program memory 210. Thus, a PROM module or chip is well-suited for use to form the program memory 210.

In addition to the program memory 210, the processor 208 may be connected to a multiplexer 211 designed to unify streams of information from simultaneous sources, through interleaving or a similar process. Thus, data from all the buffers 204 and the processor 208 may be transferred into and out of a cache 212 through the multiplexer 211. The multiplexer 211 maybe integrated with the cache 212.

The cache 212 is designed to store information pertaining to the operation of the switching station 200. Like the program memory 210, the cache 212 may be embodied as any suitable memory type such as one or more RAM DIMM or SIMM modules, PROM modules, EEPROM modules, SRAM (Static RAM) modules, flash RAM modules, or the like. Preferably, the cache 212 is erasable, and may be volatile because the information stored in the cache 212 may not be essential to the operation of the switching station 200. SRAM is well adapted for use in the cache 212.

The bus 206 may be connected to an interrupt controller (IC) 219, which permits the switching station 200 to actively interface with a prioritization system 220 connected to work in concert with the switching station 200. The prioritization system 220 preferably takes the form of a packet prioritization station 220. The packet prioritization station 220 may be integrated with the switching station 200, and may even utilize the program memory 210, processor 208, cache 212, multiplexer 211, and bus 206 of the switching station 200. This may be accomplished by providing a new set of instructions in the program memory 210 designed to carry out packet prioritization. However, the packet prioritization station 220 preferably has its own set of independent hardware, so as to be interchangeably usable with any switching station 200, and so as to avoid slowing the operation of the switching station 200. Thus, the packet prioritization station 220 may be located on an auxiliary expansion card or board (AEC), which may be connected to the switching station 200 in modular fashion.

The IC 206 may be integrated with the switching station 200 or the packet prioritization station 220, or may be a separate component from the stations 200, 220. The IC 219 may be connected to a bus 222 located in the packet prioritization station 220 such that data from the bus 206 of the switching station is transmitted to the bus 222 of the packet prioritization station 220. A processor 224, program memory 226, and cache 228 for the packet prioritization station 220 are, in turn, in communication with the bus 222.

As with the processor 208, program memory 210, and cache 212 for the switching station 200, the processor 224, program memory 226, and cache 228, may be of any suitable type. However, the processor 224 is preferably a RISC based processor. This would enable a generalized AEC with a RISC processor to be configured for use as the packet prioritization station. Likewise, the program memory 226 is in a computer-readable medium, preferably comprising an EEPROM module, to enable use of a general-purpose AEC to form the packet prioritization station 220. The EEPROM may then be reconfigured to permit use of the AEC in a different role. The cache 228 is preferably an SRAM module, so as to be erasable and rewritable.

The bus 206 is also connected to another interrupt controller (IC) 229, which enables the switching station 200 to interface with a traffic reduction system 230, which may take the form of an ARP caching station 230. As with the packet prioritization station 220, the IC 229 may be located in the switching station 200 or the ARP caching station 230. A bus 232 in the ARP caching station 230 is in communication with the IC 229 to transmit and receive data from the switching station 200.

The ARP caching station, like the packet prioritization station, may be integrated into the switching station 200, and may even operate using the program memory 210, processor 208, cache 212, and bus 206 of the switching station 200. However, like the packet prioritization station 220, the ARP caching station 230 is preferably an independent module, which may be located on an AEC. Thus, the processor 234 may be a RISC processor, the program memory 236 may be an EEPROM module, and the cache 238 may be an SRAM module. The ARP caching station 230 and packet prioritization station 220 may thus both operate as independent modules in communication with the switching station, 200.

Figure 6:
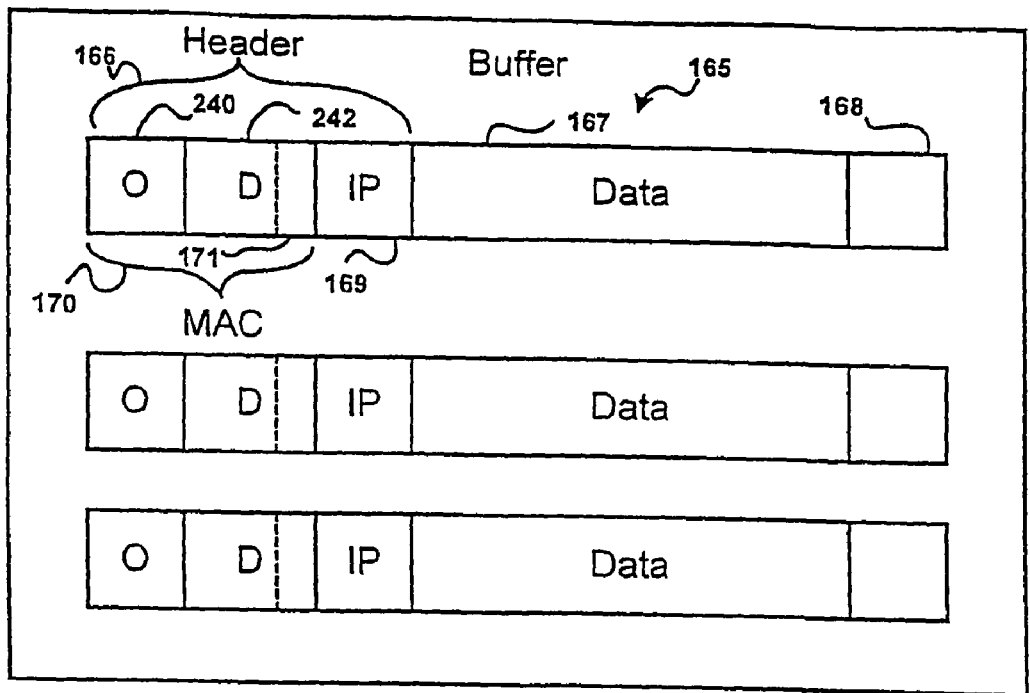
FIG. 6 is a schematic block diagram of a buffer suitable for use in the switching station of FIG. 5, in which incoming packets are stored.

Referring to FIG. 6, one possible embodiment of one of the buffers 204 of the switching station 200 is shown. Packets 165 are queued in the buffer 204 for FIFO processing. A packet 165 may be substantially as described in connection with FIG. 4a. The MAC layer addresses 170 may be located within the header 166 at the periphery of the packet, with separate origin 240 and destination 242 MAC addresses. A designated value in the broadcast field 171 denotes that the packet 165 is to be broadcast throughout all or a specified portion of the NAN 10. An IP address 169 is also provided. Data 167 may be included, or in the case of a packet such as an ARP request, no data need be sent. The footer 168 denotes the end of the packet.

Figure 7:
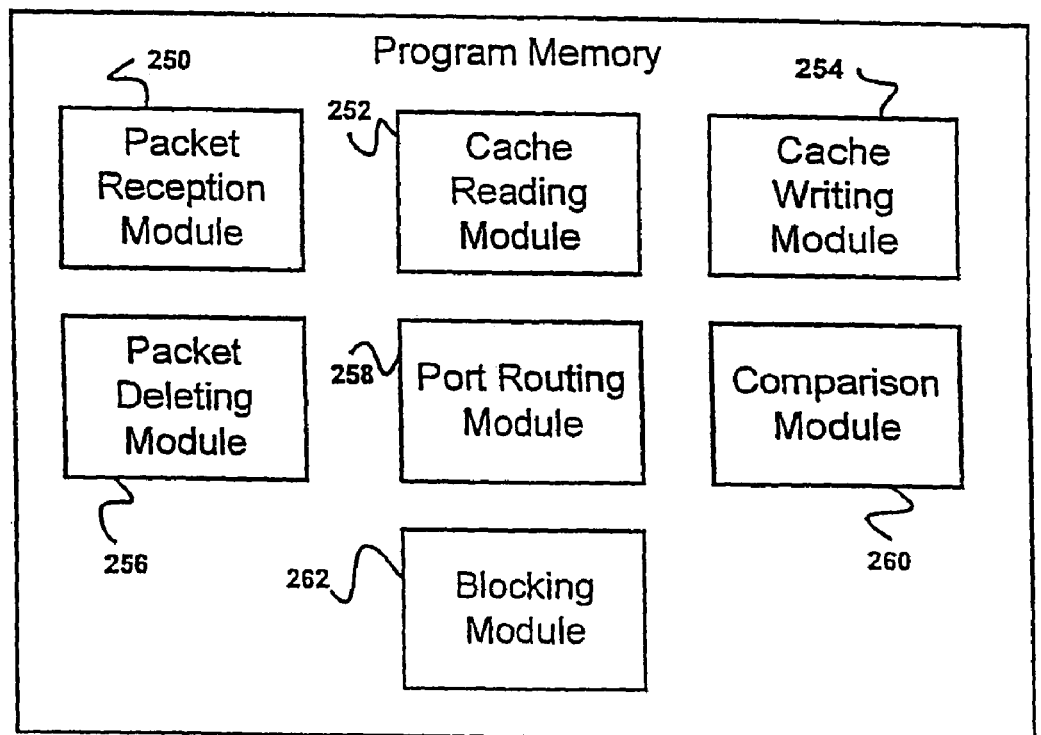
FIG. 7 is a schematic block diagram of a program memory suitable for use in the switching station of FIG. 5, with various executable modules to carry out the functions of the switching station.

Referring to FIG. 7, one possible embodiment of the program memory 210 of the switching station 200 is depicted. A number of executable modules designed to carry out the method of the current invention may be stored in the program memory 210. As described previously, some or even all of these modules may be hard coded into an ASIC to form the processor 208. However, for purposes of illustration for the following discussion, these instructions are simply represented logically as modules within some form of program memory 210. The modules may be any set of one or more executable instructions to perform a function.

A packet reception module 250 handles operations incident to receipt of a packet from one of the ports 202. A cache reading module 252 retrieves information from the cache 212 for manipulation by the processor 208. A cache writing module 254, similarly, writes data to the cache 212 for subsequent use. A packet deleting module 256 deletes unnecessary packets from the buffers 204. A port routing module 258 decides which port a given packet should be sent to in order to reach its destination.

A comparison module 260 compares separate values or entries to determine whether they are the same, such as comparing an address form the MAC layer 170 of a packet 165 with a value in the cache 212 to determine whether the address has been stored in the cache 212. A blocking module blocks incoming ports 202 with packets 165 routed to the same outgoing port 202 to permit collisions of packets 165 exiting the switching station 200. The operation of the modules 250, 252, 254, 256, 258, 260, and 262 of the program memory 210 will be further clarified by the description of the method of operation of the present invention, to be provided in the description of FIGS. 13-19.

Figure 8:
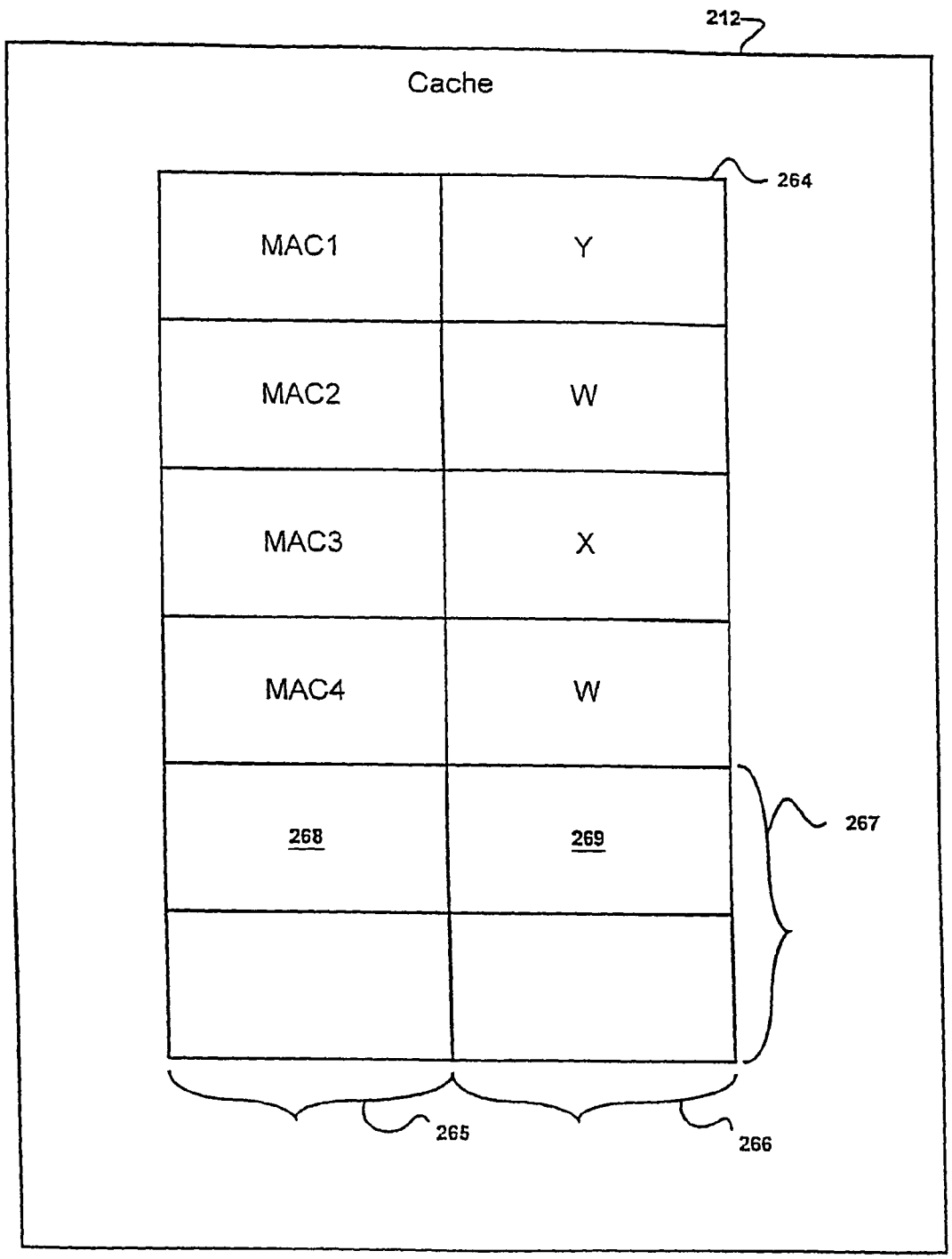
FIG. 8 is a schematic block diagram of a cache suitable for use in the switching station of FIG. 5, with a table of MAC addresses and associated ports.

Referring to FIG. 8, one possible embodiment of the cache 212 of the switching station 200 is shown. The cache 212 may contain a database 264 in the form of a table 264 associating MAC layer 170 addresses with ports 202. A MAC layer 170 address is simply a location identifier, which may act as either an origin MAC address 240, or a destination MAC address 242. Location fields 265 may be provided, in which MAC addresses are stored. The MAC address simply defines a location of a communication station 30 that is accessible from a given port. Port fields 266 corresponding to the location fields 265 show which port 202 a packet 165 must be sent through to reach a given destination MAC address 242.

Vacant fields 267 in the table 264 may be filled by retrieving the origin MAC address 240 from a packet 165 received through a port 202. The origin MAC address 240 is recorded in a vacant location field 268, and the port 202 through which it was received is recorded in a vacant port field 269 corresponding to the field 268. Thus, a MAC layer 170 address is "bound," or associated, with the port 202 through which the MAC layer 170 address is accessible.

Packets 165 may then be routed to the appropriate port 202 by the switching station 200 by looking up the destination MAC address 242 in the location fields 265 and sending the packet 165 through the corresponding port in the port fields 266. As depicted in FIG. 8, one port 202 may appear several times in the port fields 266 because there may be switches downstream from the switching station 200, so that one port 202 leads to many unique destination MAC addresses 242.

Figure 9:
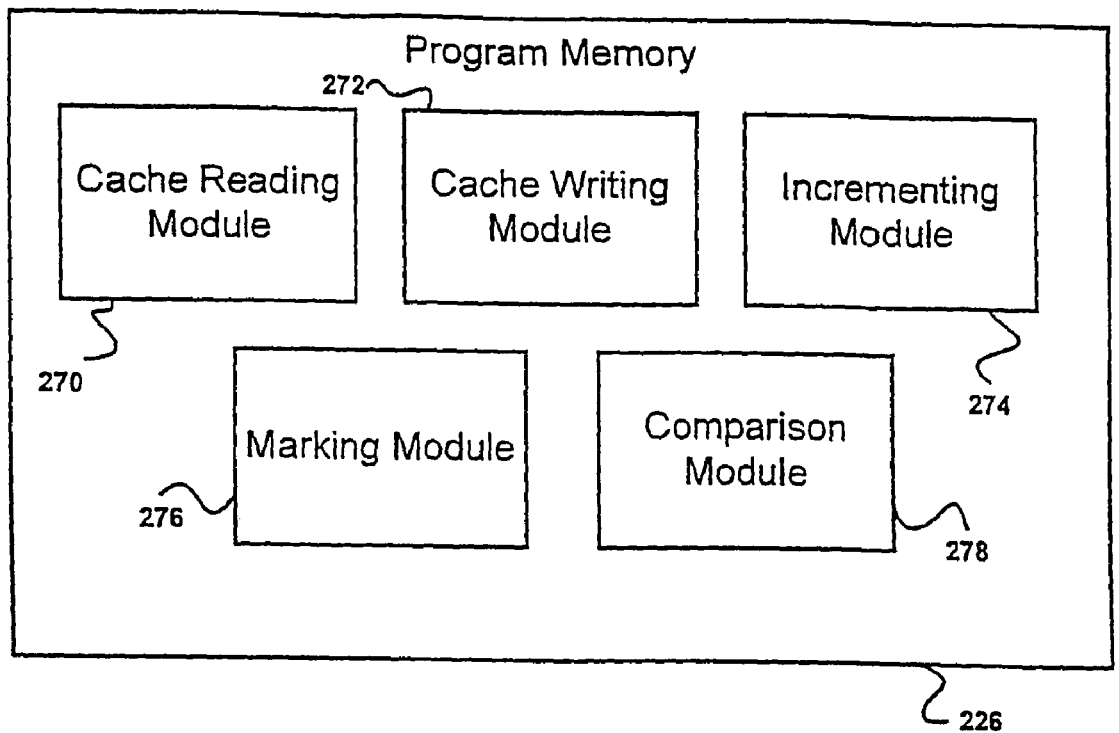
FIG. 9 is a schematic block diagram of a program memory suitable for use in the packet prioritization station of FIG. 5, with executable modules to carry out the functions of the packet prioritization station.

Referring to FIG. 9, one possible embodiment of the program memory 226 of the packet prioritization station 220 is shown. As with the switching station 200, instructions may be programmed in any way or even hard-wired into the processor 224 of the packet prioritization station. However, for the sake of discussion, instructions for the processor 224 are illustrated logically as modules residing in some form of program memory 226.

A cache reading module 270 retrieves data from the cache 228, while a cache writing module 272 stores information in the cache 228 for future retrieval. An incrementing module provides the ability to cyclically analyze the packets 165 in each of the buffers 204 to determine which receives priority for a given outgoing port 202. A marking module 276 is provided to allow the packet prioritization station 220 to mark a given port 202 or packet 165 for priority analysis. A comparison module 278 compares separate values or entries to determine whether they are the same, such as comparing an address form the MAC layer 170 of a packet 165 with a value in the cache 238 to determine whether the address has been stored in the cache 238. The operation of the modules 270, 272, 274, 276, and 278 will be clarified subsequently, as the method of operation of the present invention is described.

Figure 10:
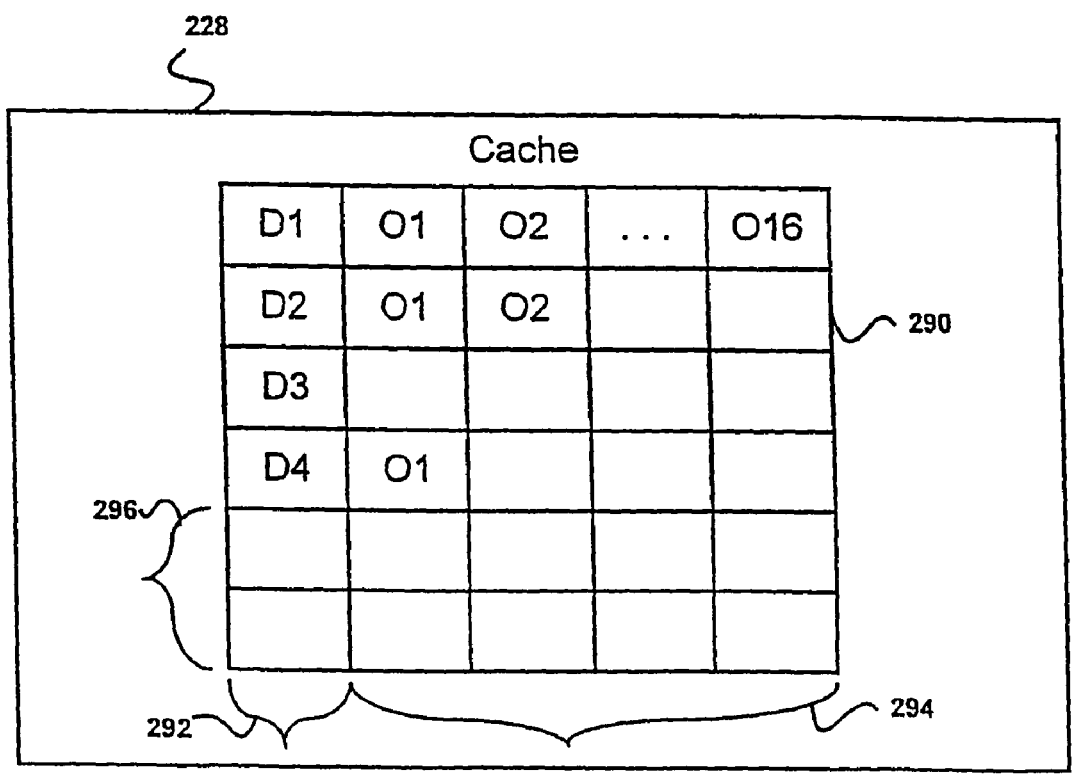
FIG. 10 is a schematic block diagram of a cache suitable for use in the packet prioritization station of FIG. 5, with a table of destination MAC addresses, each of which is associated with one or more origin MAC addresses.

Referring to FIG. 10, one possible embodiment of the cache 238 of the packet prioritization station 220 is depicted. The cache 238 maintains some property pertaining to incoming packets 165. This property will subsequently be used to prioritize the packets 165 for transmission. Preferably, the property includes a number of origin MAC addresses 240 that have previously sent transmissions to a destination MAC address 242 of the packet 165. These MAC layer 170 addresses may be stored in the following fashion.

A database 290 or table 290 may be stored in the cache 238 to track destination MAC addresses 242 and associate them with origin MAC addresses 240 from which they have received packets 165. Thus, destination fields 292 store destination MAC addresses 242, while several origin fields 294 are associated with each destination field 292. After receiving a packet 165, the packet prioritization station 220 may determine how many origin MAC addresses 240 have previously sent data to the destination MAC address 242 of the packet by looking up the destination MAC address 242 in the destination fields 292 and counting the origin MAC addresses 240 in the corresponding origin fields 294.

Vacant fields 296 of the table 290 may be filled by storing destination MAC addresses 242 and origin MAC addresses 240 from packets 165 received by the switching station 200. The packet prioritization station 220 may first look up the destination MAC address 242 from an incoming packet 165 in the destination fields 292 to determine whether it is present, and add it if it is not. The packet prioritization station 220 may then add the origin MAC address 240 from the incoming packet 165 to a vacant field corresponding to the destination MAC address 242 among the origin fields 294. Thus, each destination MAC address 240 in the table 290 has at least one origin MAC address 242 associated with it. The number of origin fields 294 may be limited to permit up to a maximum number of origin MAC addresses 240 to be stored for each destination MAC address 242, for example, 16 origins per destination.

Figure 11:
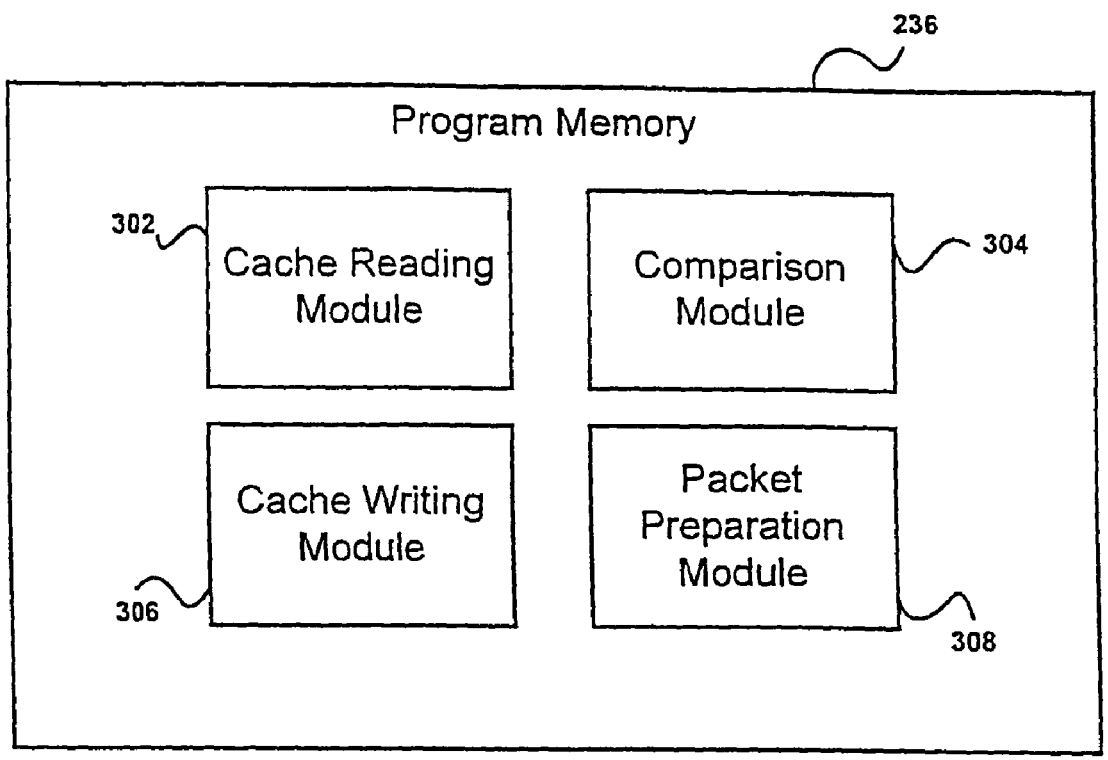
FIG. 11 is a schematic block diagram of a program memory suitable for use in the ARP caching station of FIG. 5, with executable modules to carry out the functions of the ARP caching station.

Referring to FIG. 11, one possible embodiment of the program memory 236 of the ARP caching station 230 is shown. As with the switching station 200 and the packet prioritization station 220, the executable modules shown in the program memory 236 may be configured in any suitable manner, including being hard-wired into the processor 234.

A cache reading module 302 retrieves data from the cache 238. A comparison module 304, like those of the switching station 200 and the packet prioritization station 220, compares two values to determine whether they are the same. For example, the comparison module 304 may compare an address form the MAC layer 170 of a packet 165 with a value in the cache 238 to determine whether the address has been stored in the cache 238. A cache writing module 306 stores data in the cache 238 for subsequent retrieval. A packet preparation module 308 creates a packet in the form of an ARP response of the proper format, to be sent through one of the ports 202 of the switching station 200. The proper format may be whatever packet architecture is currently in use on the NAN 10 for an ARP response. Typically, this is a packet 169 with some special designation to indicate that it is an ARP response. The operation of the modules 302, 304, 306, and 308 will be clarified during the discussion of methods of operation, starting with the description of FIG. 13.

Figure 12:
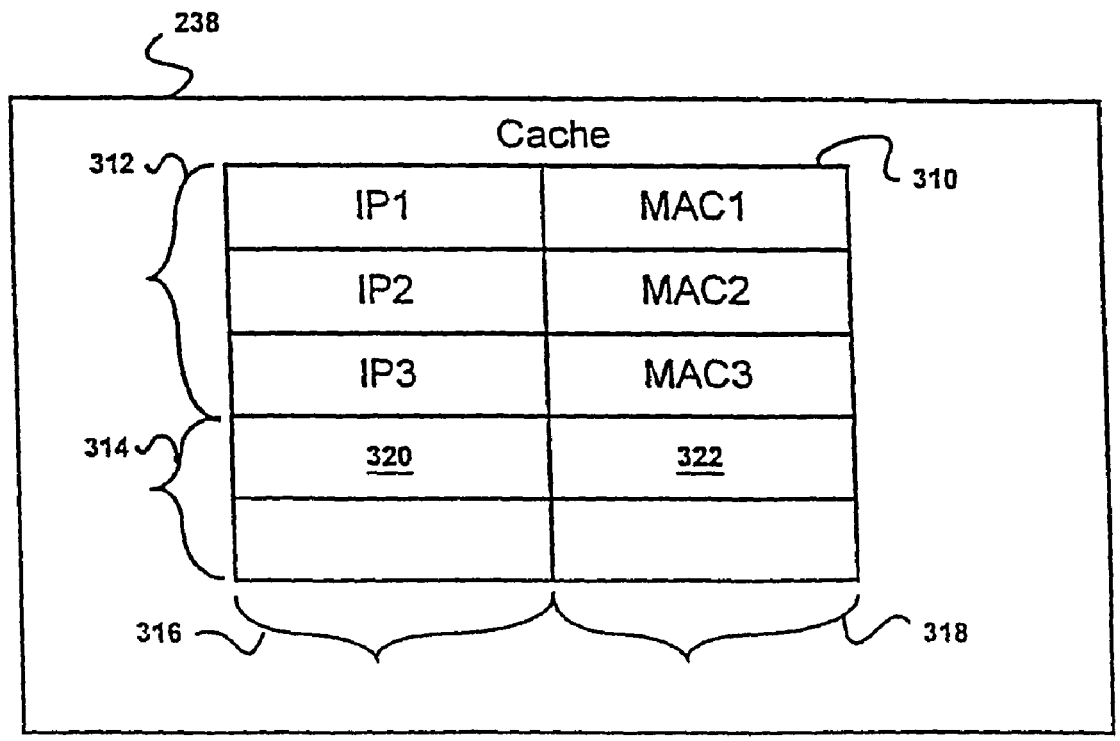
FIG. 12 is a schematic block diagram of a cache suitable for use in the ARP caching station of FIG. 5, with a table of IP addresses associated with MAC addresses.

Referring to FIG. 12, one possible embodiment of the cache 238 of the ARP caching station 230 is shown. A database 310 in the form of a table 310 may be stored in the cache 238, with IP addresses 169 associated with MAC layer 170 addresses. The table 310 may contain bound entries 312 and vacant fields 314 to accept new entries. IP address fields 316 store the IP addresses 169, while associated MAC address fields 318 contain MAC layer 170 addresses corresponding to the IP addresses 169.

When an ARP broadcast is received, it will take the form of a packet 165 with a designated IP address 136 corresponding to a requested MAC layer 170 address sought by the originator of the broadcast. The ARP caching station checks the IP address fields 316 to determine whether the designated IP address 136 is stored. If it is found, the ARP caching station may then determine whether the designated IP address 136 has an associated, requested MAC layer 170 address stored in the MAC address fields 316. If so, the ARP caching station returns the requested MAC layer 170 address to the originator of the broadcast. If the MAC layer 170 address is not found in the table 310, the ARP caching station 220 permits propagation of the packet 165 containing the ARP broadcast through the ports 202 of the switching station 200.

The vacant fields 314 may be filled by storing IP addresses 169 and MAC layer 170 addresses from incoming packets 165. For example, when a packet 165 is received by the switching station 200, the ARP caching station 230 may read the IP address 136 from the packet 165 and look it up in the IP address fields 316 to see if it has been stored. If the IP address 136 has been stored, the ARP caching station 220 checks the MAC address fields 318 to determine whether a corresponding MAC layer 170 address has been recorded in the table 310 If necessary, the ARP caching station 230 adds the MAC layer 170 address to the associated field in the MAC address fields 318. If the IP address 136 has not been stored, the ARP caching station 220 stores it in a vacant IP address field 320. The ARP caching station then adds the MAC layer 170 address to the corresponding vacant MAC address field 322.

Figure 13:
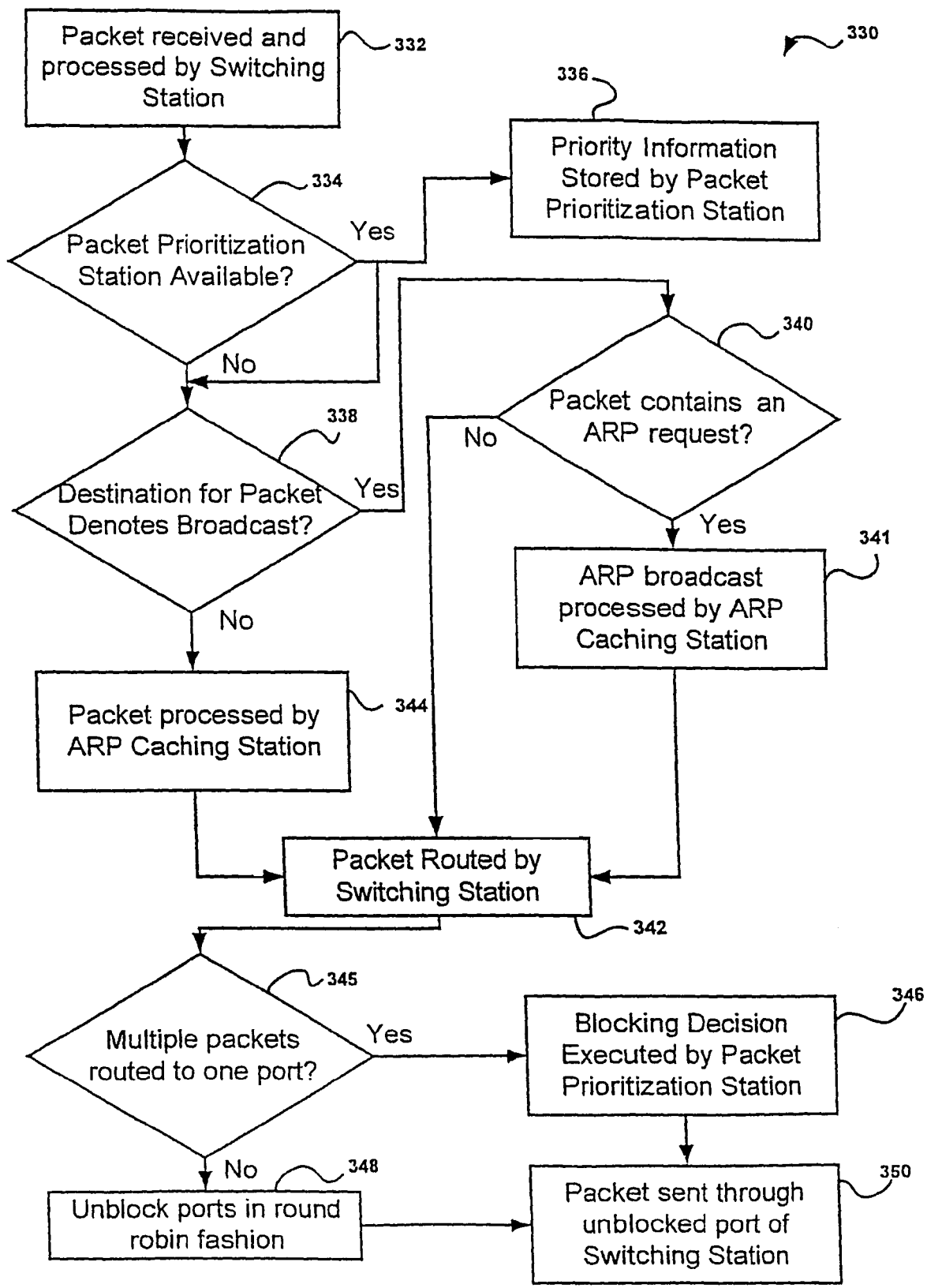
FIG. 13 is a flowchart diagram of a method suitable for carrying out the invention, in which a packet is received and processed by a switching station, packet prioritization station, and ARP caching station.

Referring to FIG. 13, one embodiment of an overall method 330 of handling a packet according to the invention is shown. Steps and queries may be added, deleted, or rearranged, as suited to the characteristics of the NAN 10. Several of the steps of the following description will be described in greater detail in FIGS. 14-19.

In a preliminary processing step 332, a packet 165 is received and preliminarily processed by the switching station 200. Then, either the processor 208 of the switching station 200 or the interrupt controller 219 executes an availability test 334. The availability test 334 determines whether the packet prioritization station 220 is available, or not. This step of the method 330 is necessary because a highly-specialized ASIC-based processor 208 operates at comparatively high speed, on the order of 8.4 Gigahertz. A RISC-based processor 224 of a packet prioritization station 220, on the other hand, may function at around 200 Megahertz, a speed orders of magnitude lower than that of the ASIC-based processor 208.

Thus, the packet prioritization station 220 may only be available to accept data during certain cycles of the switching station 200. If the packet prioritization station 220 is available, packet information, such as MAC layer 170 addresses, will be transmitted to the packet prioritization station 220 from the switching station 200. The interrupt controller 219 preferably produces an intransitive interrupt, i.e., an interrupt that continues with the primary process regardless of the operation of the auxiliary process, for the availability test 334. Thus, the switching station 200 continues processing of the packet 165 whether or not data has been sent to the packet prioritization station 220.

When available, the packet prioritization station 220 receives and stores the origin and destination MAC addresses 240, 242 from the packet 165 in a priority information storage step 336. The packet prioritization station 220 need not store MAC layer 170 addresses from every single packet 165 received; a representative sampling is sufficient to properly prioritize outgoing packets 165 later in the process 330. An intransitive interrupt permits the packet prioritization station to obtain such a representative sampling without slowing operation of the switching station 200.

After the availability test 334, a broadcast test 338 maybe performed by the processor 208, but is preferably carried out by the interrupt controller 229 in communication With the ARP caching station 230. The broadcast test 338 determines whether the packet 165 is a broadcast. The broadcast test 338 is preferably of a transitive type, since the status of the packet 165 must be resolved before operation of the switching station 200 may continue. Thus, the broadcast test 338 interrupts the operation of the switching station 200, if necessary, to process broadcast packets 165.

A broadcast packet 165 may have a specially designated destination MAC address 242, an empty destination MAC address 242, or a specially designated broadcast field 171. If the packet 165 is a broadcast, an ARP request test 340 is executed by the interrupt controller 229, or preferably by the processor 236 of the ARP caching station 230. If executed by the processor 236, no interrupt occurs because the switching station 200 is still waiting for the status of the packet 165 to be determined. The ARP request test 340 determines whether the packet 165 is an ARP broadcast, or a broadcast requesting a requested MAC layer 170 address for a designated IP address 136. Special designations in the MAC layer 170 addresses, IP address 136, or data 167 of the packet 165 may be read to make this determination.

If the packet 165 is an ARP broadcast, the request is then processed by the ARP caching station 230 in an ARP request processing step 341. This entails creating a response with the requested MAC layer 170 address if the requested MAC layer 170 address is in the cache 238 of the ARP caching station 230. Otherwise, the ARP caching station 230 permits the ARP broadcast packet 165 to be broadcast.

If the packet 165 is a broadcast, but is not an ARP broadcast, it need not have further interaction with the ARP caching station, because it has no associated IP address 136 and MAC layer 170 address to store, and does not require an ARP response. Thus, the packet proceeds to a packet routing step 342 in which the packet 165 returns to the switching station 200 for routing.

"Routing" generally refers to the process of selecting a path for a data transmission. In the context of FIGS. 5 through 19, "routing" refers more specifically to determining which of the ports 202 a packet 165 should be sent through to reach a given destination. "Allocation" is simply the process of assigning a packet 165 a destination MAC address 242 or an IP address 136 denoting a destination. This may be done by using a destination MAC address 242 contained within the packet 165. However, significant benefits may be obtained through the use of additional steps to determine where the packet 165 should most efficiently be sent, as described in greater detail below.

If the broadcast test 338 determines that the packet 165 is not a broadcast, the packet will be processed by the ARP caching station 230 in an ARP caching step 344. In the ARP caching step 344, the IP address 136 and destination MAC address 242 are stored in the cache 238 of the ARP caching station in associated form for future use. The packet 165 is then routed by the switching station 200 in the packet routing step 342.

After routing, yet a multiple routed packets test 345 is executed, possibly by the processor 208 of the switching station 200, but preferably by the interrupt controller 219 linked to the packet prioritization station 220. The multiple routed packets test 345 determines whether multiple packets 165 in the buffers 204 have been routed to a single outgoing port 202. Like the broadcast test 338, the multiple routed packets test 345 preferably takes the form of a transitive interrupt, because the switching station 200 cannot proceed to block ports 202 until an order for blocking has been determined. If multiple packets 165 are routed to a single outgoing port 202, a blocking decision step 346 occurs in which a blocking decision is made by the packet prioritization station 220 to determine which packet 165 is sent first.

The blocking decision of the blocking decision step 346 may be made by assigning a high priority to packets 165 being sent to destination MAC addresses 242 with more than a threshold number of associated origin MAC addresses 240 in the cache 228 of the packet prioritization station 220. The remaining packets receive a low priority. Although multiple priority gradations may be used, high and low are simple and enable rapid operation of the packet prioritization station 220. Among packets 165 with the same priority, the blocking decision step 346 may unblock ports 202 in a round robin, or cyclical form. Unblocking is simply the process of permitting the first queued packet 165 in a buffer 204 to exit through its outgoing port 202, or ports 202, in the case of a broadcast.

If multiple packets 165 are not routed to a single outgoing port 202, no special blocking decision need be made. Thus, in a round robin blocking step 348, no priority need be assigned to any packet 165, but unblocking of the ports 202 occurs in round robin, or cyclical form among all packets. Finally, after one or more ports 202 has been unblocked, the packet 165 is transmitted through the port 202 or ports 202 in a packet sending step 350. The process 330 then begins anew with the next packet 165.

Figure 14:
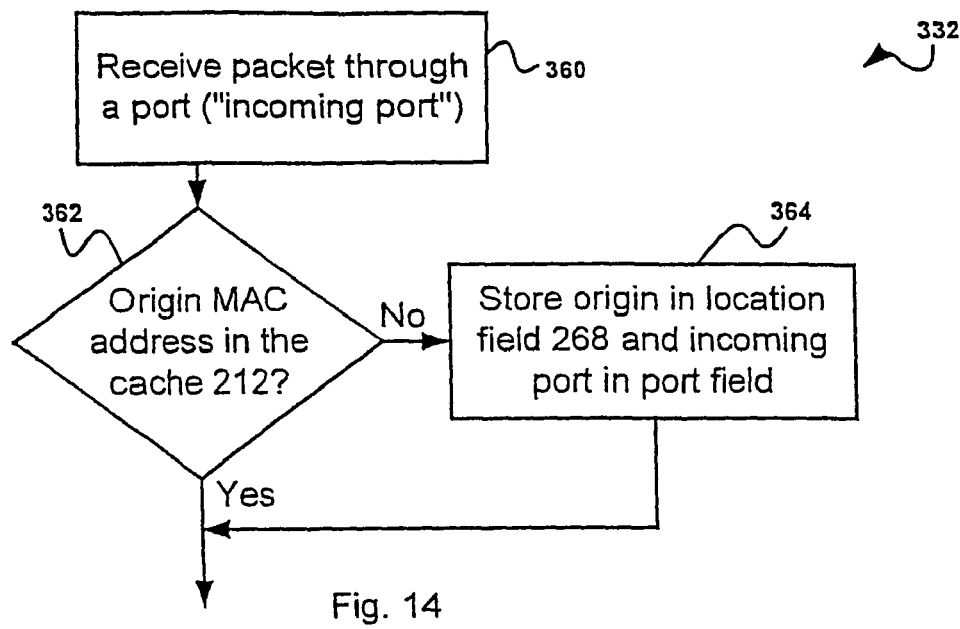
FIG. 14 is a flowchart diagram of a packet receiving step suitable for the method of FIG. 13.

Referring to FIG. 14, the preliminary processing step 332 is shown in greater detail. In a packet receiving step 360, a packet 165 is received through an incoming port 202 and enters the associated buffer 204. In an origin cached test 362, the switching station 200 determines whether the origin MAC address 240 is in the location fields 265 of the cache 212. If not, the switching station 200 performs a port association step 364.

The port association step 364 may include storage of the origin MAC address 240 in the vacant location field 268, and storage of an identifier (such as a letter) for the incoming port 202 in the vacant port field 269. The switching station 200 will then be able to route response packets 165 back to that origin MAC address 240 without broadcasting the packets through multiple ports 202.

Figure 15:
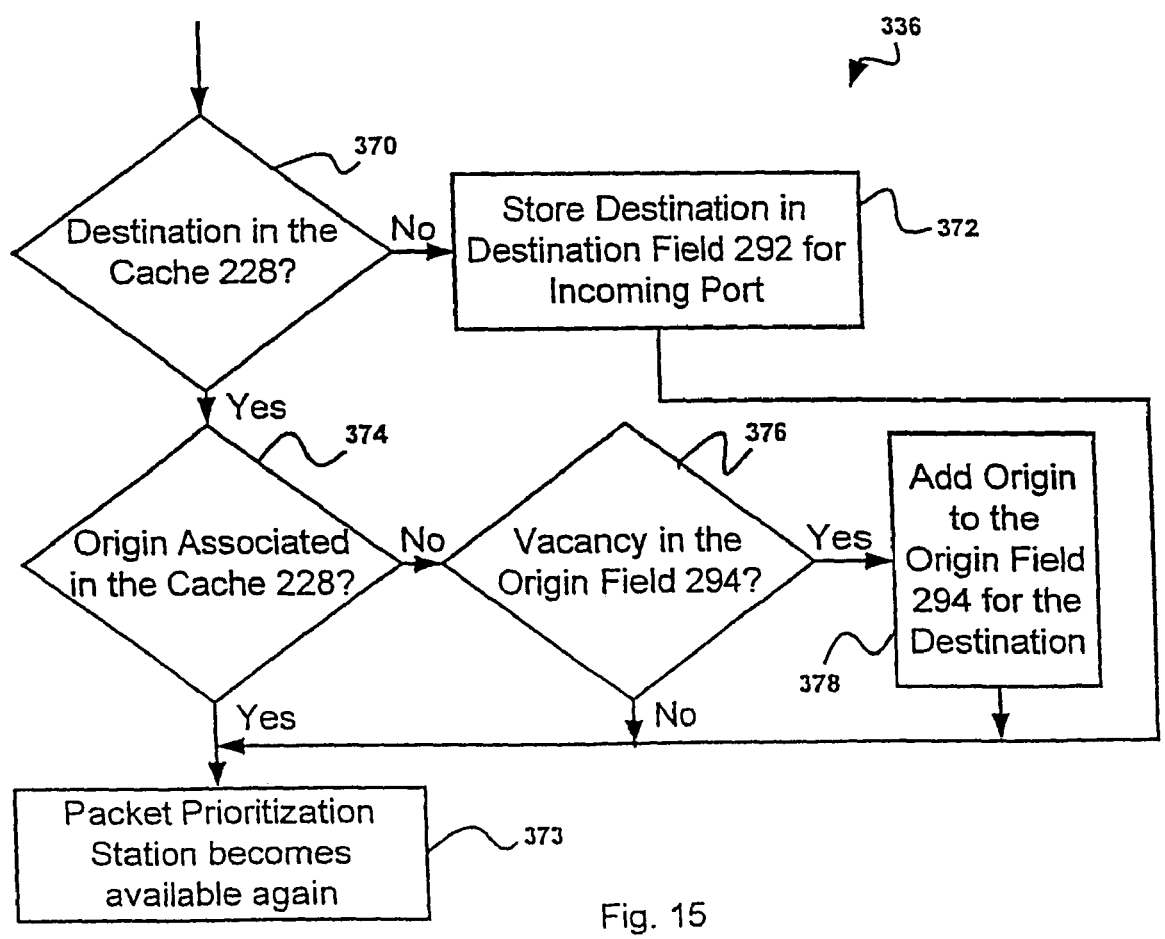
FIG. 15 is a flowchart diagram of a priority information storage step suitable for the method of FIG. 13.

Referring to FIG. 15, the priority information storage step 336 is shown in greater detail. In a destination cached test 370, the packet prioritization station 220 determines whether the destination MAC address 242 of the packet 165 is in the cache 228. If the destination MAC address 242 is not found in the cache 228, the destination MAC address 242 is added to the destination field 292 of the cache 228 in a destination storage step 372. There is no need to proceed further, so the packet prioritization station 220 again becomes available in an availability step 373.

If the destination MAC address 242 was found in the cache 228, an origin associated test 374 determines whether the origin MAC address 240 of the packet 165 has been associated with the destination MAC address 242 in the origin fields 294 of the cache 228. If not, in a vacancy test 376, the packet prioritization station 220 checks to see if there is vacancy in the origin fields 294 associated with the destination MAC address 242.

If there is vacancy, the packet prioritization station 220 performs an origin storage step 378. In the origin storage step 378, the origin MAC address 240 is added to the appropriate field of the origin fields 294 for the destination MAC address 242. The packet prioritization station 220 then becomes available again in the availability step 373. This also occurs if the origin MAC address 240 is already in the cache 228, or if there is no vacancy.

Figure 16:
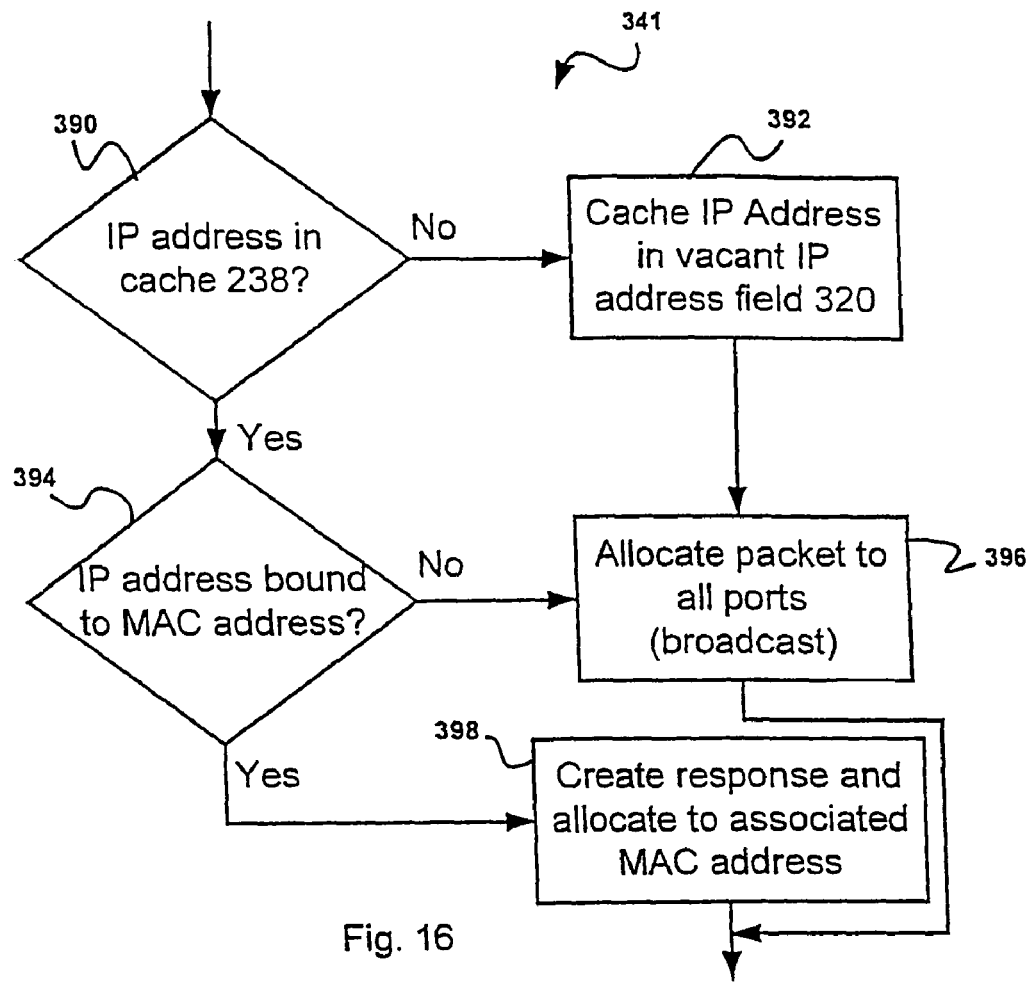
FIG. 16 is a flowchart diagram of an ARP request processing step suitable for the method of FIG. 13.

Referring to FIG. 16, the ARP request processing step 341 is shown in greater detail. In an IP address cached test 390, the ARP caching station 230 determines whether the designated IP address 136 of the packet 165 is in the IP address fields 316 of the cache 238. If the designated IP address 136 is not found, the designated IP address 136 may be cached in a vacant IP address field 320 of the cache 238 in an IP address caching step 392. If the designated IP address 136 is already present, the ARP caching station 230 performs an IP address bound test 394 to determine whether a MAC layer 170 address is bound to the IP address 136.

If no associated MAC layer 170 address is found, or if the IP address 136 was just cached in the IP address caching step 392, the ARP caching station 230 performs an ARP request allocating step 396. In the ARP request allocating step 396, the ARP broadcast 165 is allocated to all ports 202 of the switching station except the incoming port 202. In effect, since the cache 238 does not contain the requested MAC layer 170 address, the ARP broadcast 165 is allocated for further broadcast from the switching station 200.

If the requested MAC layer 170 address is found in the cache 238, the ARP caching station 230 initiates a response creation step 398, in which a response to the ARP broadcast 165 is created. The response may take the form of a packet 165 with the origin MAC address 240 of the ARP broadcast used to form the destination MAC address 242 of the packet 165 of the response. The packet 165 of the response has thereby been allocated to a single destination, and will only have to be sent through a single port 202. The requested MAC layer 170 address is contained in the packet 165 of the response, either as the origin MAC address 240, or in the data 167 of the packet 165. Thus, the response containing the requested MAC layer 170 address is returned directly to the originator of the ARP broadcast.

Figure 17:
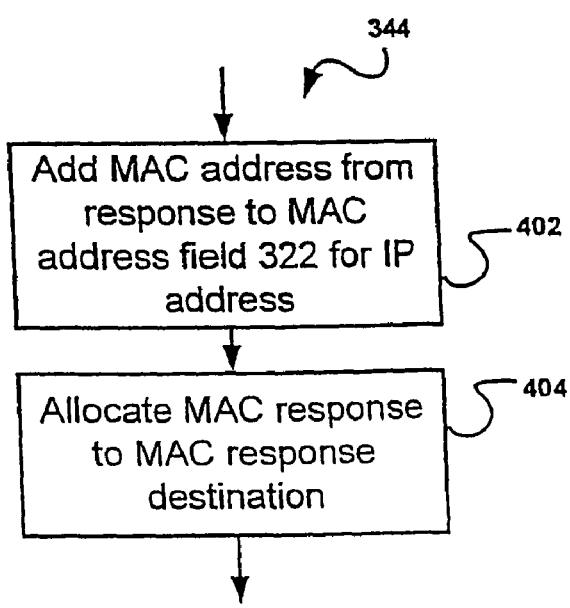
FIG. 17 is a flowchart diagram of an address caching step suitable for the method of FIG. 13.

Referring to FIG. 17, the ARP caching step 344 is shown in greater detail. Since the packet 165 is not a broadcast, as determined by the broadcast test 338, it must have a destination MAC address 242. Consequently, the ARP caching station 230 may perform a MAC address binding step 402. The MAC address binding step 402 entails adding the destination MAC address 242 to the appropriate field of the MAC address fields 318 to bind it to the IP address 169 of the packet 165.

The IP address 169 was previously cached in the IP address caching step 392. Thus, the destination MAC address 242 may be obtained from the cache 238 of the ARP caching station 230 for response to another, subsequently received packet 165 containing an ARP request. In a MAC response allocation step 404, the packet 165 may simply be assigned to the destination MAC address 242 from the packet 165.

The cache 238 is preferably cleared periodically. Since IP addresses 169 from most ISP's are only temporary or semi-permanent, a user logging onto an Internet service provider (ISP) for a second time may have a different IP address than that of the prior session. Thus, clearing the cache 238 may prevent inaccuracies from building up and slowing down the NAN 10. Clearing the cache 238 periodically also permits a smaller cache 238 to be used. Clearing may take place after a suitable time period, such as one day.

Figure 18:
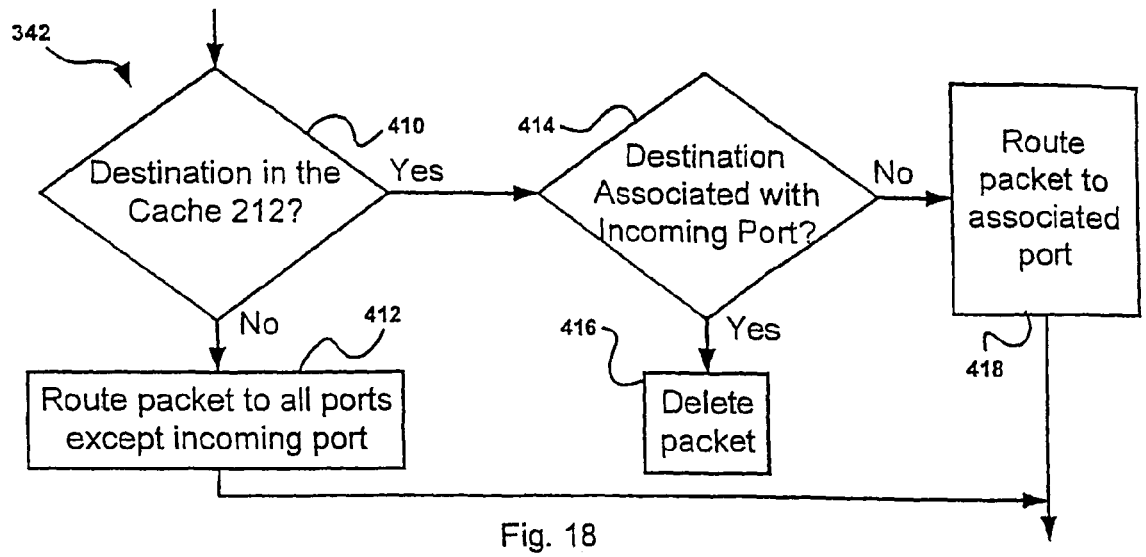
FIG. 18 is a flowchart diagram of a packet routing step suitable for the method of FIG. 13.

Referring to FIG. 18, the packet routing step 342 is shown in greater detail. Routing may consist of adding a tag or identifier (not shown) to the packet 165 in the buffer 204, storing a suitable port-to-packet correlation (not shown) in the cache 212, or any other-method of linking one or more ports 202 to the packet 165. In a destination cached test 410, the switching station 200 determines whether the destination MAC address 242 is in the cache 212 of the switching station 200.

This may be accomplished by looking up the destination MAC address 242 in the MAC address fields 265 of the cache 212. If the destination MAC address 242 is not found, the switching station 200 has no record of which port 202 leads to the destination MAC address 242, and must therefore route the packet 165 to all ports 202 except the incoming port 202 in an all ports routing step 412.

If the destination MAC address 242 is found in the cache 212, the switching station 200 may then determine whether the destination MAC address 242 is associated with the incoming port 202 in a destination associated test 414. Thus, the switching station 200 may be configured to check the field of the port fields 266 that corresponds with the destination MAC address 242 from the MAC address fields 265.

If the port 202 associated with the destination MAC address 242 is the incoming port 202 of the packet 165, the packet 165 is already travelling through the lines and switches downstream of the port 202 through which it needs to be sent, so the packet 165 need not be sent at all. Thus, if the destination MAC address 242 is associated with the incoming port 202, the packet 165 is, deleted from its buffer 204 in a packet deleting step 416. If the destination MAC address 242 is associated with a different port 202 than the incoming port 202, switching station 200 performs an associated port routing step 418, in which the packet is routed to the associated port 202.

Figure 19:
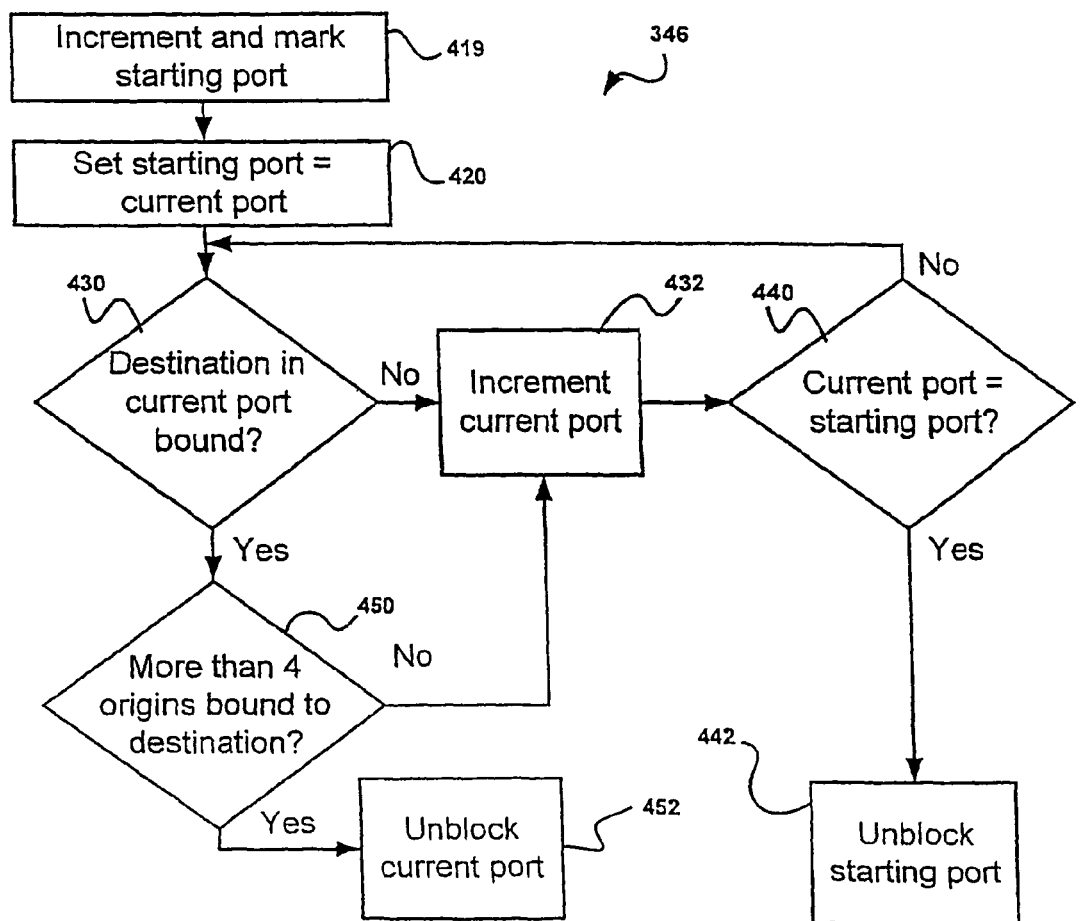
FIG. 19 is a flowchart diagram of a blocking decision step suitable for the method of FIG. 13.

Referring to FIG. 19, the blocking decision step 346 is shown in greater detail. Since the packet routing step 342 described previously occurs for each buffer 204, several packets 165 have been routed to their appropriate ports 202. If packets 165 from two or more buffers 204 are routed to a single port 202 simultaneously, the switching station 200 will need to block all but one of the buffers 204 to transmit a single packet 165 at a time. This must occur in sequence, until multiple buffers 204 no longer contain packets 165 routed to the same outgoing port 202.

The process followed by the blocking decision step 346 ensures that the blocking decision is made intelligently. When a blocking decision must be made, more important packets 165 are prioritized for transmission. Such a decision may occur according to the process shown in FIG. 19. First, in a step 419, the starting port 202 is incremented and marked. The starting port 202 is the port 202 connected to the buffer 204 through which the last transmission was sent. "Incrementing" entails choosing the next port.

Incrementing may be carried out in an arbitrary, cyclical order, for example, W, then X, then Y, then Z, then W again, and so on, for the ports 202 shown in FIG. 5. If a data transmission was just sent from the buffer 204 attached to a port X, incrementing the current port 202 causes a port Y to become the current port 202. Simply incrementing the ports 202 in such a cyclical fashion, with no variation to account for priority, may be referred to as "cyclical," "round robin," or "alternating" transmission of packets 165.

If no port 202 has priority, the packet 165 in the current port 202 is sent. Priority analysis may first be undertaken to determine whether another of the ports 202 should have priority over the current port 202. Thus, in an incrementing and marking step 420, a current port 420 is designated and set to be the same port 202 as the starting port 202. The current port 202 is the port 202 under prioritization analysis.

Analysis begins in a port associated test 430, in which the packet prioritization station 220 determines whether the destination MAC address 242 of the current port 202 has been routed to only a single outgoing port 202. Thus, in the packet routing step 342, if the packet was routed to all ports 202 except the incoming port 202, as in the all ports routing step 412, the answer to the port associated test 430 will be "no." If, in the packet routing step 342, the packet 165 was routed to a single port 202, as in the associated port routing step 418, the port associated test 430 will return a "yes."

If the answer is "no," i.e., the packet 165 in the buffer 204 of the current port 202 is routed to multiple ports 202, the current port 202 is incremented to the next port 202. The net effect of the port associated test 430 is to pass over packets 165 that must be broadcast to multiple ports 202 to prioritize packets 165 with a known outgoing port 202. As described above, any type of broadcast uses a comparatively greater portion of bandwidth because it must be sent along multiple routes. Thus, broadcast traffic is delayed by the step 430 in favor of traffic that requires less bandwidth for transmission.

After the current port 202 has been incremented, i.e., set to the next port 202 in the cycle, a cycle completed test 440 inquires whether the current port 202 has become the same as the starting port 202. If so, the buffer 204 of the current port 202 is unblocked for transmission through its routed outgoing port 202 or ports 202 in a starting port unblocking step 442. If not, the new current port 202 is analyzed by the step 430. The effect of the cycle completed test 440 is to allow priority analysis to occur for each port 202 only once before a transmission is made. If no port 202 meets the qualifications for priority, the starting port 202, i.e., the next port 202 in line after the previous transmission is sent, may be unblocked by the starting port unblocking step 442.

If the answer to the port associated test 430 was "yes," i.e., the packet 165 in the buffer 204 of the current port 202 is routed to a single outgoing port 202, priority analysis continues on the current port 202 in a step 450. In the step 450, the packet prioritization station 220 determines whether four or more origin MAC addresses 240 are associated, or bound, to the destination MAC address 242 of the packet 165 in the buffer 204 of the current port 202. This is accomplished by looking up the destination MAC address 242 of the packet in the destination fields 292 of the cache 228, and counting the origin MAC addresses 240 in the origin fields 294 associated with the destination MAC address 242. If more than some threshold number, for example, four, origin MAC addresses 240 are associated with the destination MAC address 242, the current port 202 may be unblocked to send the packet in a current port unblocking step 452. Otherwise, the packet 165 does not receive priority and the current port 202 is incremented in the current port incrementing step 432 to continue with priority analysis.

The effect of the multiple bound origins test 450 is to prioritize packets 165 to destination MAC addresses 242 that have received packets 165 from multiple origin MAC addresses 240. This is effective because communication stations 30 that receive traffic from many locations have been shown to be more likely to be receiving more time-critical traffic, or to have many users. Communication stations 30 that receive data from only a few sources have been shown to be more likely transferring larger amounts of data, for which some delay is acceptable. Thus, the multiple bound origins test 450, with the aid of the cache 228 maintained by the packet prioritization station 220, effectively prioritizes transmission of the most important information.

"Unblocking" a port 202 enables transmission of the packet 165 in the buffer 204 of that port 202, through its routed outgoing port 202 or ports 202. The cycle described above occurs as many times as necessary to clear the traffic routed to one outgoing port 202. When this has been accomplished, unblocking may simply occur in round robin form, i.e., cyclically unblocking ports 202 with no priority decision, as in the round robin blocking step 348, until the need once again arises to make a blocking decision.

As with the cache 238, the cache 228 is preferably cleared periodically. This may be necessary primarily because the usage patterns of a communication station 30 located at a given MAC layer 170 address may change over time. A communication station 30 may be used for a highly time-critical application one day, and then for less critical applications the next day. Clearing the cache 228 effectively resets the priority of communication stations 30 on the NAN 10 so that a newer and more accurate determination can be periodically made. Clearing the cache 228 also enables a smaller cache 228 to be used, because fewer MAC layer 170 addresses need be stored. The cache 228 may be cleared after a period of suitable length, such as one day.

The NAN of the present invention provides certain advantages including providing high speed (high band width) Internet access at a low cost compared to conventional technologies. Advantages of the NAN also include the capability of real-time video conferencing. The NAN allows a region such as a geographical region of otherwise unrelated entities, such as a town or neighborhood, to be networked in high speed computer communication.

The NAN may be financed at least partially by utilities in order to expedite installation and may rely on the rights of way of public utilities such as power companies. The "last mile" dilemma is also solved under the present invention, as the system allows for inexpensive installation of facilities for the "last mile" of a network infrastructure and relatively faster operation thereof. Thus, an advantage of the NAN is that it provides cost effective last mile service and delivery.

The NAN also operates at very high speeds. Preferably, message traffic is directly delivered to its destination, rather than passing the message traffic through a central server or router. Indeed, in certain embodiments, the NAN efficiencies are achieved without a central server altogether.

Additionally, the NAN provides support for a broader variety of devices and types of devices to be networked. The NAN system of the present invention does not rely on the telephone line infrastructure, and consequently eliminates handling errors that occur with user log ons. Additionally, the telephone lines and other telecommunications infrastructure receive less traffic and are less likely to be jammed with message traffic when the NAN is employed to relieve them of being overburdened. Indeed, the NAN in one embodiment achieves total independence from the telecommunication infrastructure.

Also, no modem hardware or protocol is necessary at the user facility. Conventional T-1 lines, fiber converters, and cable modems are unnecessary in achieving the much higher speeds of the NAN of the present invention. Additionally, Internet access may be provided over the NAN, and Internet connection may operate at comparatively high speeds. For instance, Internet access may in one example be as high as ten Mbps while employing certain currently available hardware.

The NAN allows free competition among Internet service providers and allows them to freely hook into the NAN system. The Internet connectivity is always on and continuous at any given communicating station without the need of a dial-up. Due to the elimination of modems in connecting to the Internet, low data losses are experienced. For instance, hand shaking errors between modems and error data that otherwise arises between modems may be reduced or eliminated. This is largely due to the absence of protocol conversions with the inventive system.

The operational hardware and software of the NAN include hubs, packets, bridges, and gateways disposed at different points to allow directly routed, packeted traffic. The system completes routing and distributes traffic at the lowest possible segment. Direct routing may be peer-to-peer rather than being controlled by a switchboard, server, or central office. The results of this arrangement is very high speed packet transfer.

The system may rely on MAC addresses and static, masqueraded, IP addressing rather than dynamic IP addressing. The system may provide a binding between a hardware device and a user so the system stores the user's public IP addresses.

Additionally, communications within the network are secure and the network is user friendly. The high-speed networking supports real-time communications with cameras. Indeed, because of the low cost, users can connect to more devices, one example of which is utility meters. The system makes remote meter reading and monitoring of other types of utility services cost effective.

The NAN of the present invention is also unique in that no network administration is necessary to control local message traffic. Traffic may be independent of any governing authority. Additionally, because the Internet is both a large scale system and localized within a geographic area, business services such as advertising can be offered locally, making them more efficient. Thus, local advertising may be directed to a local audience. The system may support interconnection with virtually any devices within a community. The system may utilize permanent IP addresses due to a unique Dynamic Host Configuration Protocol (DHCP).

The NAN 10 of the present invention is further distinguished from the prior art in that packet prioritization is provided for packets transmitted through the switching stations 200 of the NAN 10. The switching stations 200 may prioritize traffic to destinations receiving traffic from multiple origins. This accords a generally higher priority to traffic with a higher likelihood of being time-critical, such that packets with a higher relative importance are transmitted first. All of this may be accomplished through the use of packet prioritization stations 220 that can be added or modified at will for use with the switching stations 200.

The NAN 10 is further unique in that a method for reducing traffic from ARP broadcasts is provided. This may be accomplished by caching MAC layer 170 addresses and associating them with their corresponding IP addresses. ARP broadcast traffic is reduced by simply returning the requested MAC layer 170 address from the cache 238. This saves a great deal of bandwidth over broadcasting multiple ARP request packets 165 while waiting for a response from the communication station 30 that has the requested MAC layer 170 address.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A switching station, comprising:
   a cache configured to store information indicating, for a given destination of a data transmission received by the switching station, a quantity of different origins that are associated with the given destination;
   a processor coupled to the cache, wherein the processor is configured to receive first and second data transmissions, and wherein the processor is configured to assign the second data transmission a higher transmission priority relative to the first data transmission based, at least in part, on whether a threshold quantity of different origins are associated with respective destinations of the first and second data transmissions, wherein the threshold quantity is greater than or equal to two; and
   wherein the switching station is configured to transmit a packet in the second data transmission before transmitting a packet in the first data transmission in response to the second data transmission having the assigned higher transmission priority.

2. The switching station of claim 1, wherein the threshold quantity is four.

3. The switching station of claim 1, wherein the given destination is indicated by a MAC address corresponding to the given destination.

4. The switching station of claim 1, wherein the switching station is configured to periodically clear information from the cache.

5. The switching station of claim 1, wherein the switching station includes a plurality of buffers, individual ones of which are associated with a respective port of the switching station, and wherein the processor is configured to cyclically analyze packets stored in the plurality of buffers to determine relative transmission priorities of the stored packets.

6. The switching station of claim 1, wherein the processor is configured to receive the second data transmission subsequent to the first data transmission.

7. The switching station of claim 1, wherein the processor is configured to receive at least respective portions of the first and second data transmissions within an overlapping time period.

8. A method, comprising:
   a switching device sampling at least first and second ones of a plurality of received data transmissions, wherein each received data transmission indicates an origin and a destination of the transmission;
   the switching device storing information associating the destinations of the sampled data transmissions with the origins of the sampled data transmissions; and
   the switching device determining transmission priorities for at least the first and second ones of the plurality of data transmissions based, at least in part, on the stored information, wherein determining the transmission priorities comprises:
      assigning a highest transmission priority to data transmissions that include a destination associated with the greatest quantity of different origins as indicated by the stored information; and
      iteratively assigning a next highest transmission priority to data transmissions that include a destination associated with the next greatest quantity of different origins as indicated by the stored information; and
   the switching device transmitting a portion of data in the second data transmission before transmitting a portion of data in the first data transmission in response to the second data transmission having a higher assigned transmission priority than the first data transmission.

9. The method of claim 8, wherein the data transmissions comprise data packets.

10. The method of claim 8, wherein at least one of the plurality of received data transmissions is not assigned a transmission priority based, at least in part, on the at least one received data transmission including a destination that is not associated with at least a threshold quantity of different origins as indicated by the stored information.

11. The method of claim 8, wherein the at least a portion of the first data transmission is received before the at least a portion of the second data transmission.

12. A switching station, comprising:

a cache configured to store a set of information indicating that a destination of a first data transmission received by the switching station has been the target destination of two or more previous data transmissions, wherein the two or more previous data transmissions were directed from two or more different origins; and first means for using the stored set of information to determine a priority of the first data transmission relative to other data transmissions received by the switching station;

wherein the switching station is configured to transmit a packet in the first data transmission before transmitting a packet in one of the other data transmissions in response to the determined priority of the first data transmission.

13. The switching station of claim 12, wherein the first means includes a processor and a memory storing program instructions executable by the processor to use at least some of the set of information stored in the cache to assign descending transmission priorities to data transmissions indicated by the cache as having successively fewer quantities of different origins associated with respective destinations of the data transmissions.

14. The switching station of claim 12, wherein the switching station is configured to receive, within an overlapping time period, data packets in at least one of the two or more previous data transmissions and data packets in the first data transmission.

15. An article of manufacture including a non-transitory computer-readable medium having instructions stored thereon, wherein execution of the instructions by a switching device causes the switching device to perform operations comprising:

storing information indicating, for individual ones of a plurality of different destination addresses previously received by the switching device, one or more associated addresses corresponding to different origins, wherein the stored information includes a first set of information indicating that a first destination address is associated with a first quantity of addresses corresponding to different origins, the first quantity being greater than or equal to two, and wherein the stored information includes a second set of information indicating that a second destination address is associated with a second quantity of addresses corresponding to different origins, wherein the second quantity is less than the first quantity;

receiving first and second sets of one or more data packets, wherein the first set of data packets includes information indicating that it is destined for the first destination address, and wherein the second set of packets includes information indicating that it is destined for the second destination address;

assigning the received first set of data packets a higher transmission priority than the received second set of data packets based, at least in part, upon the first and second sets of information; and transmitting one or more packets in the first set of data packets before transmitting one or more packets in the second set of data packets in response to the first set of data packets having been assigned the higher transmission priority.

16. The article of manufacture of claim 15, wherein the destination addresses are MAC addresses.

17. The article of manufacture of claim 15, wherein the operations further include periodically clearing the stored information indicating associations between destination addresses and addresses corresponding to different origins.

18. The article of manufacture of claim 15, wherein said assigning the first set of data packets a higher transmission priority than the second set of data packets is based, at least in part, upon the first quantity being greater than the second quantity.

19. The article of manufacture of claim 15, wherein said assigning the first set of data packets a higher transmission priority than the second set of data packets is based, at least in part, upon a first comparison between the first quantity of addresses corresponding to different origins and a threshold quantity of addresses corresponding to different origins, wherein the threshold quantity is greater than or equal to two.

20. The article of manufacture of claim 19, wherein said assigning the first set of data packets a higher transmission priority than the second set of data packets is further based, at least in part, upon a second comparison between the second quantity of addresses corresponding to different origins and the threshold quantity of addresses corresponding to different origins.

21. The article of manufacture of claim 20, wherein said assigning the first set of data packets a higher transmission priority than the second set of data packets is based, at least in part, on the first quantity of addresses corresponding to different origins being greater than the threshold quantity of addresses corresponding to different origins and on the second quantity of addresses corresponding to different origins being less than or equal to the threshold quantity of addresses corresponding to different origins.

22. The article of manufacture of claim 15, wherein the one or more packets in the second set of data packets are received before the one or more packets in the first set of data packets.

23. A method, comprising:

a network device storing information indicating, for each of two or more of a plurality of different destination addresses previously received by the network device, one or more different origin addresses from which data transmissions to that destination address have originated, and wherein the stored information also indicates that the network device has previously received, from at least a first quantity of different origin addresses, data transmissions addressed to a first of the plurality of destination addresses;

the network device receiving first and second sets of one or more data packets, wherein the first set of data packets includes information indicating that it is destined for the first destination address; and in response to the stored information indicating that the first quantity of different origin addresses is greater than a threshold quantity of different origin addresses, assigning the first set of data packets a higher transmission priority relative to at least the second set of data packets, wherein the threshold quantity is greater than or equal to two; and the network device transmitting one or more packets in the first set of data packets before transmitting one or more packets in the second set of data packets in response to the first set of data packets having been assigned the higher transmission priority relative to at least the second set.

24. The method of claim 23, further comprising transmitting sets of data packets from ports of the network device in a round robin order in the absence of a determination by the network device that a stored set of data packets has a destination address associated with more than the threshold quantity of different origin addresses.

25. The method of claim 23, further comprising transmitting the first set of data packets from a first port of the network device, wherein the at least a second set of data packets is destined to be transmitted from a second port of the network device, and wherein said assigning includes prioritizing the first port relative to the second port.

26. The method of claim 23, wherein the plurality of different destination addresses and the one or more different origin addresses are specified by MAC addresses.

* * * * *

UNITED STATES PATENT AND TRADEMARK OFFICE
CERTIFICATE OF CORRECTION

PATENT NO. : 7,835,350 B2
APPLICATION NO. : 11/180764
DATED : November 16, 2010
INVENTOR(S) : Anderson et al.

It is certified that error appears in the above-identified patent and that said Letters Patent is hereby corrected as shown below:

Page 2, item (56), under "U.S. Patent Documents", in Column 1, Line 14, delete "5,963,566" and insert -- 5,963,556 --.

Page 2, item (56), under "U.S. Patent Documents", in Column 1, Line 14, delete "Rajsuman et al." and insert -- Varghese et al. --.

Column 1, line 31, delete "communication" and insert -- communication. --.

Column 1, line 57, delete "replacing," and insert -- replacing --.

Column 5, line 61, delete "controlled" and insert -- controlled. --.

Column 6, line 44, delete "repeater" and insert -- repeater, --.

Column 6, line 60, delete "switching-station," and insert -- switching station, --.

Column 10, line 47, delete "bridges." and insert -- bridges --.

Column 11, line 54, delete "datapackets" and insert -- data packets --.

Column 15, line 8, delete "fill" and insert -- full --.

Column 16, line 41, delete "AR-P" and insert -- ARP --.

Column 16, line 61, delete "Internic." and insert -- Internic. --.

Column 17, line 66, delete "switch." and insert -- switch --.

Column 18, line 21, delete "3 Oa" and insert -- 30a --.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,835,350 B2

Column 19, line 19, delete "an. IP" and insert -- an IP --.

Column 19, line 59, delete "Internic" and insert -- Internic --.

Column 22, line 65, delete "228," and insert -- 228 --.

Column 23, line 29, delete "station," and insert -- station --.

Column 29, line 61, delete "other-method" and insert -- other method --.

Column 30, line 19, delete "is, deleted" and insert -- is deleted --.

Column 32, line 39, delete "log ons." and insert -- logons --.